US012786025B2

(12) United States Patent
You et al.

(10) Patent No.: US 12,786,025 B2
(45) Date of Patent: Nov. 3, 2026

(54) METHOD PERTAINING TO GUARD SYMBOL CONSIDERING MULTIPLE TIMING MODES FOR IAB, AND DEVICE USING SAME

(71) Applicant: LG Electronics Inc., Seoul (KR)

(72) Inventors: Hyangsun You, Seoul (KR); Hyunsoo Ko, Seoul (KR); Jaenam Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 190 days.

(21) Appl. No.: 18/681,756

(22) PCT Filed: Aug. 5, 2022

(86) PCT No.: PCT/KR2022/011603
§ 371 (c)(1),
(2) Date: Oct. 9, 2024

(87) PCT Pub. No.: WO2023/014133
PCT Pub. Date: Feb. 9, 2023

(65) Prior Publication Data

US 2025/0047536 A1 Feb. 6, 2025

(30) Foreign Application Priority Data

Aug. 6, 2021 (KR) ........................ 10-2021-0104098

(51) Int. Cl.
*H04L 27/26* (2006.01)

(52) U.S. Cl.
CPC ................................ *H04L 27/2605* (2013.01)

(58) Field of Classification Search
CPC ....................... H04L 27/2605; H04W 56/0045
USPC ........................................................ 375/260
See application file for complete search history.

(56) References Cited

U.S. PATENT DOCUMENTS

2021/0211341 A1 7/2021 Luo et al.
2024/0064671 A1* 2/2024 Huang .............. H04W 72/0446

FOREIGN PATENT DOCUMENTS

WO WO 2021/154058 8/2021

OTHER PUBLICATIONS

Extended European Search Report in European Appln. No. 22853508.4, mailed on Jun. 27, 2025, 10 pages.
Moderator (AT&T), "Feature Lead Summary #2 of 8.10.1," R1-2106055, 3GPP TSG-RAN WG1 #105-e, e-Meeting, May 10-27, 2021, 29 pages.

(Continued)

*Primary Examiner* — Fitwi Y Hailegiorgis
(74) *Attorney, Agent, or Firm* — Fish & Richardson P.C.

(57) ABSTRACT

Provided are a method for receiving first guard symbol information and a device using same, the method being performed by a node in a wireless communication system and comprising the steps of: receiving the first guard symbol information; and applying the first guard symbol information, wherein the first guard symbol information indicates the number of guard symbols for a first portion of combinations among all combinations of mobile terminal (MT) operations and distributed unit (DU) operations, the number of guard symbols for the first portion of combinations is the number of guard symbols related to a timing alignment case 6, and the guard symbols are not used on the basis of switching between the MT operations and the DU operations.

7 Claims, 22 Drawing Sheets

(56) References Cited

OTHER PUBLICATIONS

Moderator (AT&T), "Summary #1 of [104-e-NR-eIAB-01]," R1-2101855, 3GPP TSG RAN WG1 #104-e, e-Meeting, Jan. 25-Feb. 5, 2021, 18 pages.
Moderator (Qualcomm Incorporated), "Final feature lead summary on enhancements for simultaneous operation of IAB-node's child and parent links," R1-2106313, 3GPP TSG RAN WG1 Meeting #105-e, May 10-27, 2021, 66 pages.
Intel Corporation, "Other Enhancements for Simultaneous Operations," 3GPP TSG RAN WGI #105-e, R1-2104925, e-Meeting, May 19-27, 2021, 15 pages.
International Search Report and Written Opinion in Appln. No. PCT/KR2022/011603, mailed on Nov. 17, 2022, 6 pages (with English translation).
NTT DOCOMO, Inc., "Resource multiplexing between child and parent links of an IAB node," 3GPP TSG RAN WG1 #105-e, R1-2105716, e-Meeting, May 10-28, 2021, 7 pages.
Samsung, "Enhancements to Timing, Power Control and CLI for NR IAN," 3GPP TSG RAN WGI #105-e, R1-2105332, e-Meeting, May 19-27, 2021, 6 pages.

* cited by examiner

METHOD PERTAINING TO GUARD SYMBOL CONSIDERING MULTIPLE TIMING MODES FOR IAB, AND DEVICE USING SAME

CROSS-REFERENCE TO RELATED APPLICATIONS

This application is a National Stage application under 35 U.S.C. § 371 of International Application No. PCT/KR2022/011603, filed on Aug. 5, 2022, which claims the benefit of Korean Patent Application No. 10-2021-0104098, filed on Aug. 6, 2021. The disclosures of the prior applications are incorporated by reference in their entirety.

TECHNICAL FIELD

The present specification relates to wireless communication.

BACKGROUND

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

Meanwhile, the present specification seeks to provide a method for guard symbols considering multiple timing modes for IAB and a device using the same.

SUMMARY

According to one embodiment of the present disclosure, a method and apparatus utilizing the guard symbol information may be provided wherein the guard symbol information indicates a number of guard symbols for a first partial combination of all combinations of mobile terminal (MT) operation and distributed unit (DU) operation, wherein the number of guard symbols for the first partial combination is the number of guard symbols related with a timing alignment case 6, and wherein the guard symbols are unused symbols based on switching between MT operation and DU operation.

According to the present disclosure, it may be provided that the number of guard symbols can be adjusted appropriately depending on the timing case applied by the IAB node.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

DETAILED DESCRIPTION

In the present specification, "A or B" may mean "only A", "only B" or "both A and B". In other words, in the present specification, “A or B” may be interpreted as “A and/or B”. For example, in this specification, “A, B or C” refers to “only A”, “only B”, “only C”, or “any combination of A, B and C”.

A forward slash (/) or comma used herein may mean “and/or”. For example, “A/B” may mean “A and/or B”. Accordingly, “A/B” may mean “only A”, “only B”, or “both A and B”. For example, “A, B, C” may mean “A, B, or C”.

In the present specification, “at least one of A and B” may mean “only A”, “only B”, or “both A and B”. In addition, in the present specification, the expression “at least one of A or B” or “at least one of A and/or B” can be interpreted the same as “at least one of A and B”.

In addition, in the present specification, “at least one of A, B and C” means “only A”, “only B”, “only C”, or “any combination of A, B and C”. In addition, “at least one of A, B or C” or “at least one of A, B and/or C” can mean “at least one of A, B and C”.

In addition, parentheses used in the present specification may mean “for example”. Specifically, when described as “control information (PDCCH)”, “PDCCH” may be proposed as an example of “control information”. In other words, “control information” of the present specification is not limited to “PDCCH”, and “PDCCH” may be suggested as an example of “control information”. In addition, even when described as “control information (i.e., PDCCH)”, “PDCCH” may be proposed as an example of “control information”.

In the present specification, technical features that are individually described in one drawing may be implemented individually or at the same time.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 1:
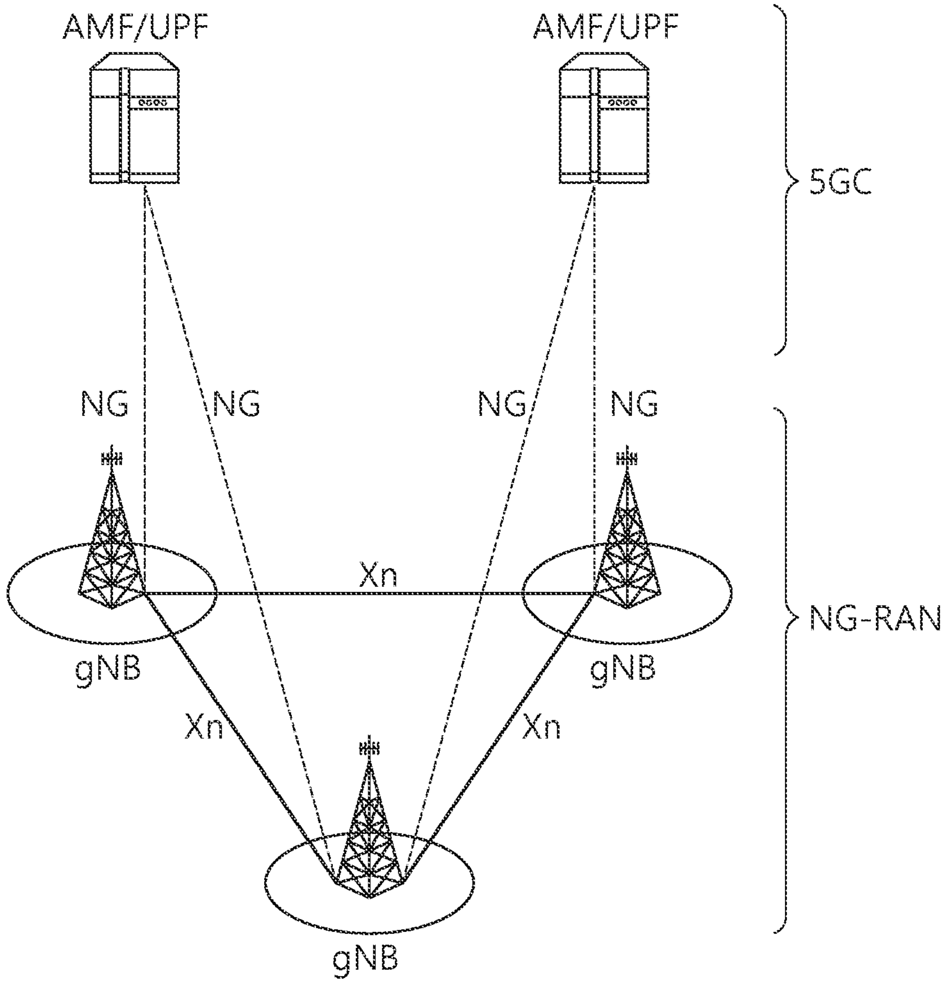
FIG. 1 illustrates a system structure of a new generation radio access network (NG-RAN) to which NR is applied.

FIG. 1 illustrates a system structure of a new generation radio access network (NG-RAN) to which NR is applied.

Referring to FIG. 1, the NG-RAN may include a gNB and/or an eNB providing a user plane and a control plane protocol termination to a terminal. FIG. 1 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 2:
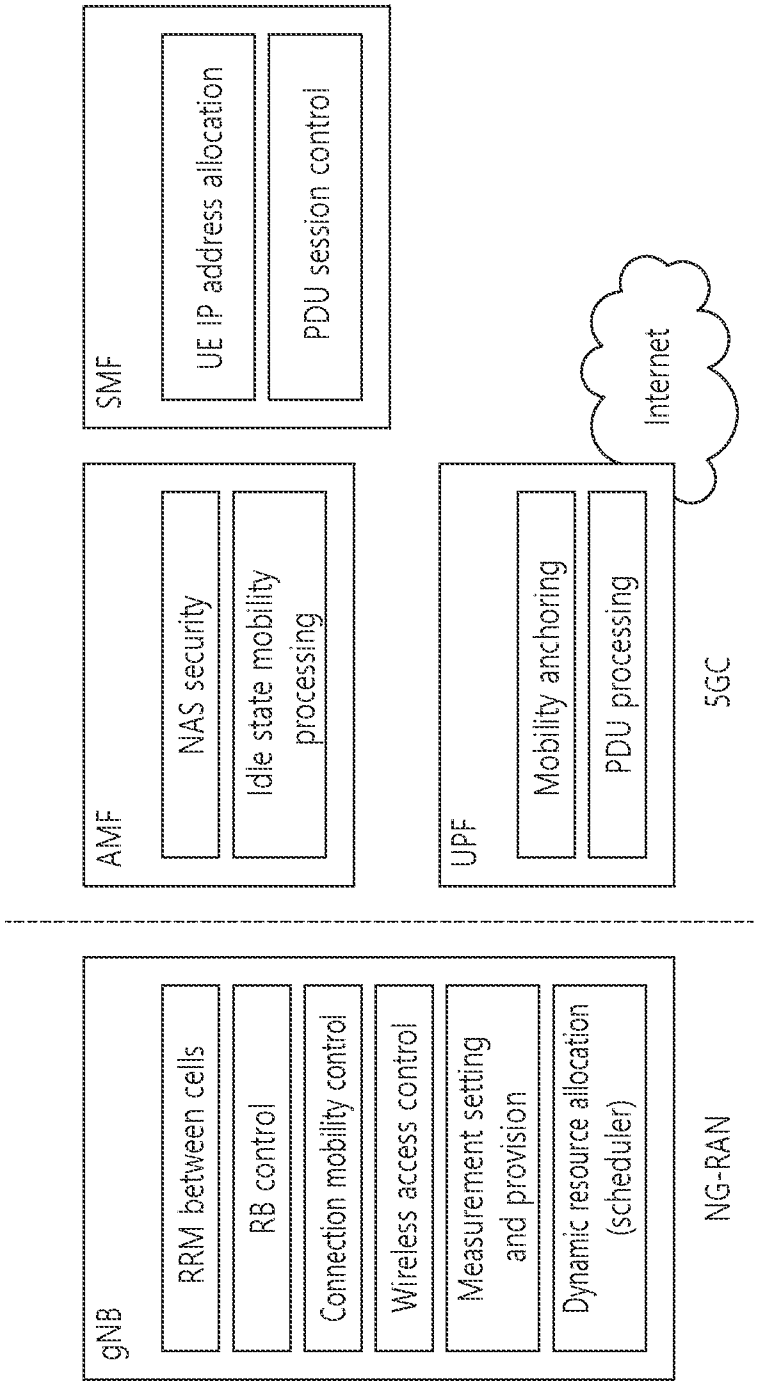
FIG. 2 illustrates functional partitioning between NG-RAN and 5GC.

FIG. 2 illustrates functional partitioning between NG-RAN and 5GC.

Referring to FIG. 2, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 3:
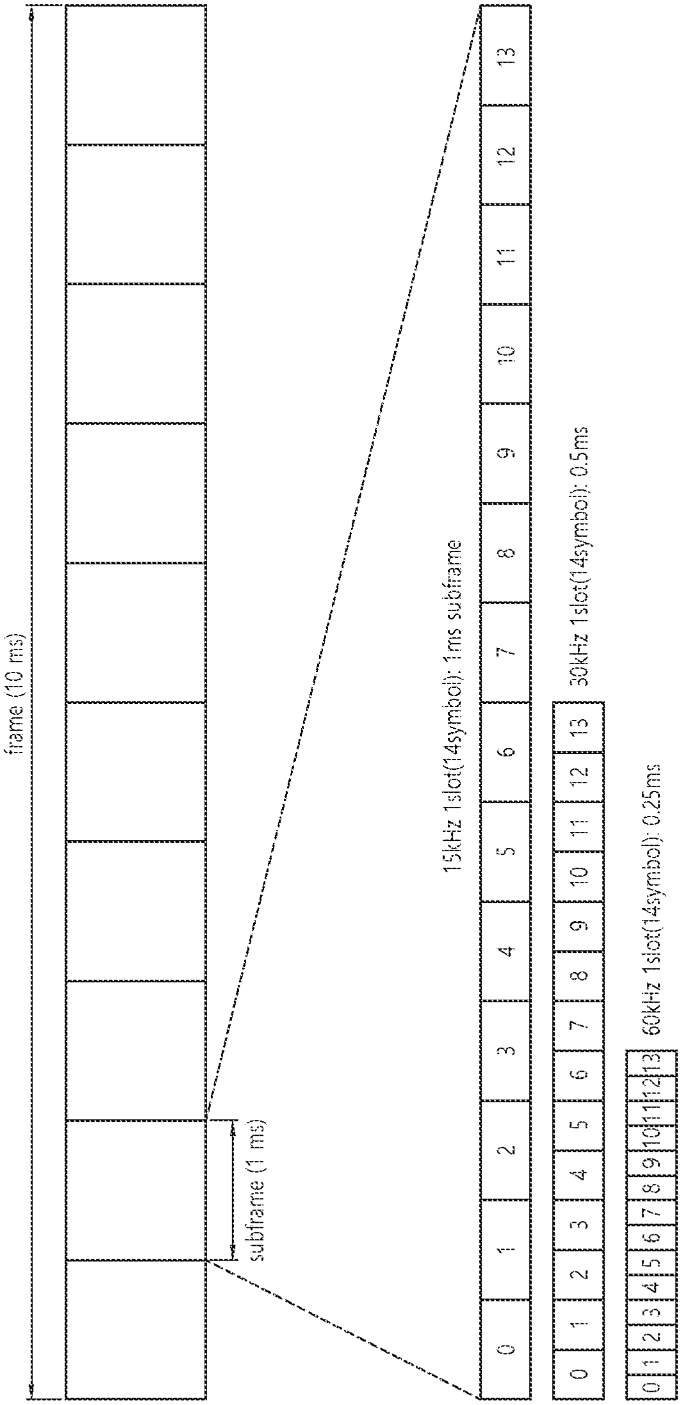
FIG. 3 illustrates a frame structure applicable in NR.

FIG. 3 illustrates a frame structure applicable in NR.

Referring to FIG. 3, a frame may consist of 10 milliseconds (ms) and may include 10 subframes of 1 ms.

A subframe may include one or a plurality of slots according to subcarrier spacing.

Table 1 below shows subcarrier spacing configuration μ.

TABLE 1

| μ | $\Delta f = 2^{\mu} \cdot 15$[kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame\mu}_{slot}$), the number of slots in a subframe ($N^{subframe\mu}_{slot}$), and the number of symbols in a slot ($N^{slot}_{symb}$) according to the subcarrier spacing configuration μ.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 3 shows μ=0, 1, and 2. A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. The following technologies/characteristics may be applied to NR. <Self-contained subframe structure>

Figure 4:
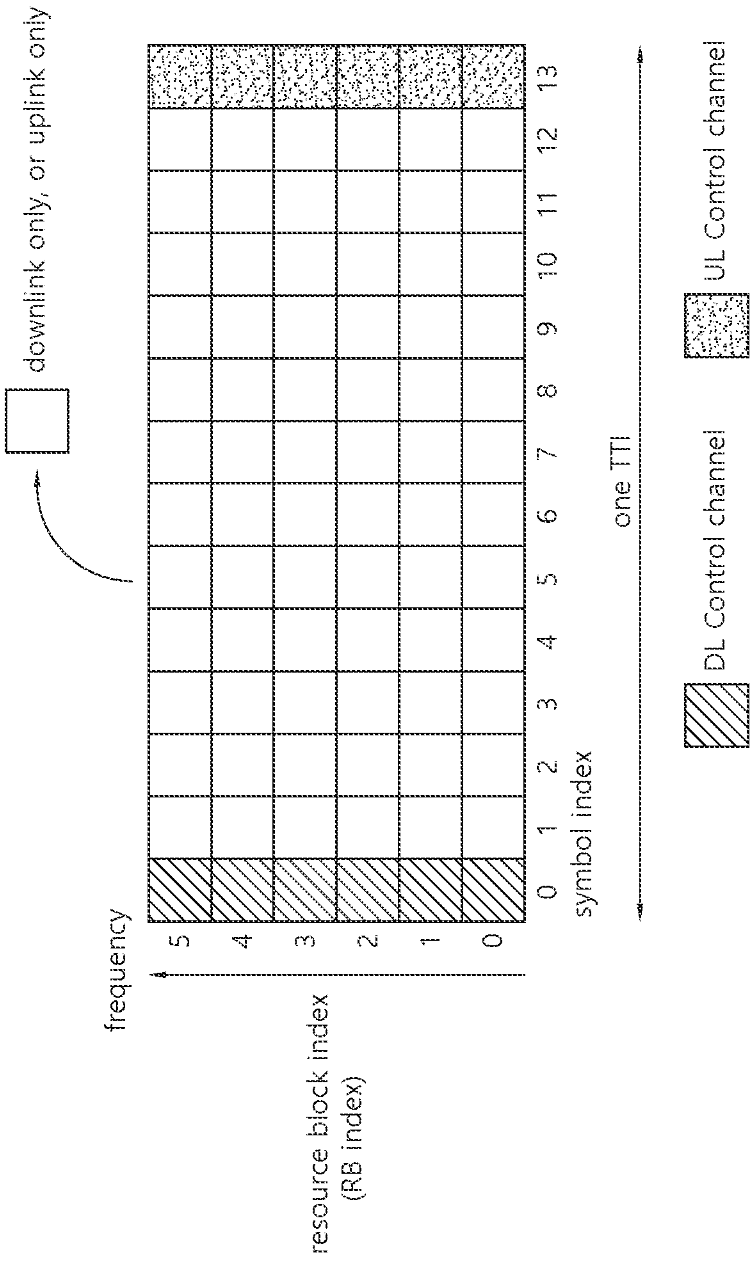
FIG. 4 illustrates an example of a frame structure for the new radio access technology (new RAT).

FIG. 4 illustrates an example of a frame structure for the new radio access technology (new RAT).

In NR, as a purpose for minimizing latency, as shown in FIG. 4, a structure having a control channel and a data channel being processed with Time Division Multiplexing (TDM), within one TTI, may be considered as one type of frame structure.

In FIG. 4, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

Figure 5:
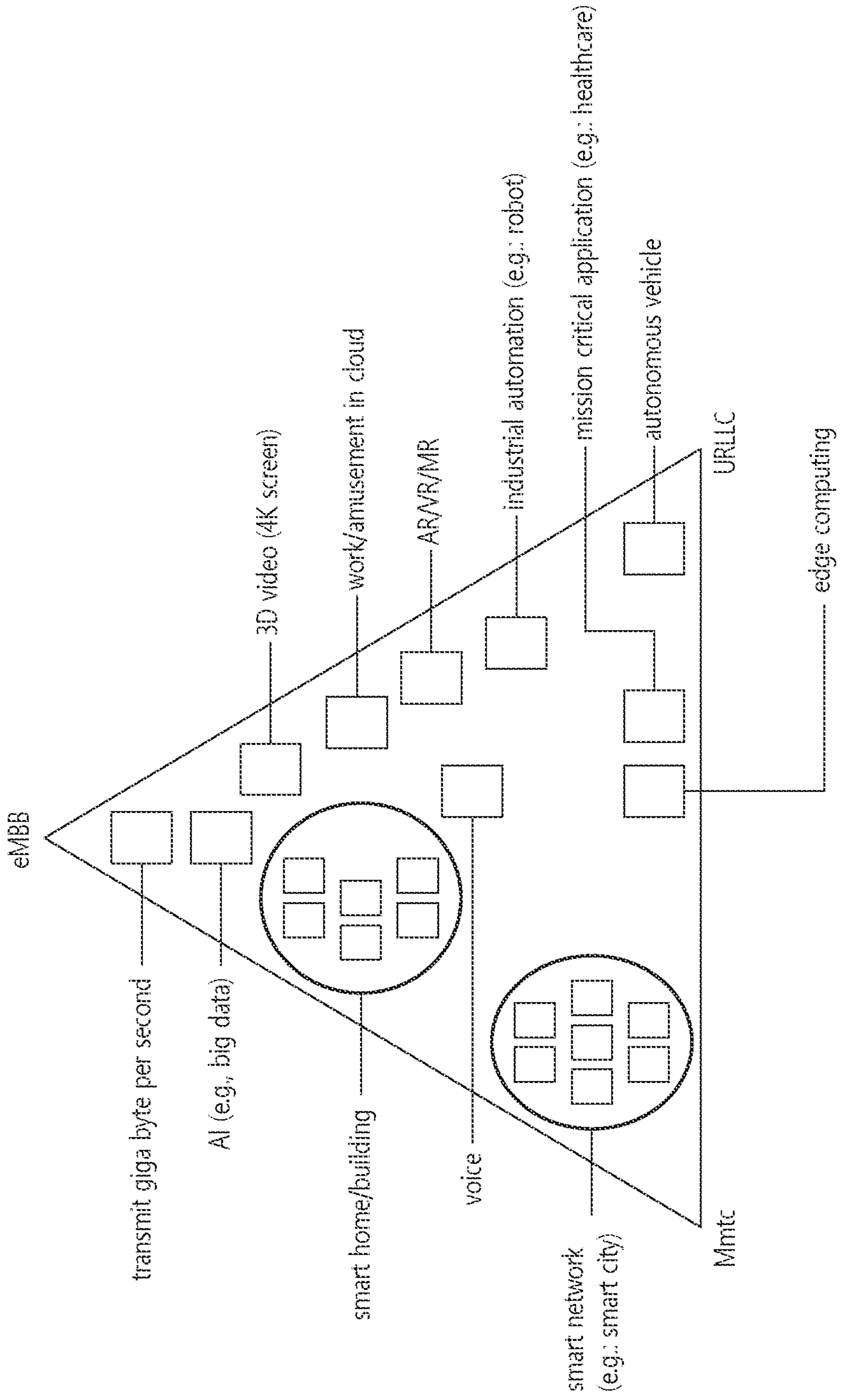
FIG. 5 shows examples of 5G usage scenarios to which the technical features of the present specification can be applied.

FIG. 5 shows examples of 5G usage scenarios to which the technical features of the present specification can be applied. The 5G usage scenarios shown in FIG. 5 are only exemplary, and the technical features of the present specification can be applied to other 5G usage scenarios which are not shown in FIG. 5.

Referring to FIG. 5, the three main requirements areas of 5G include (1) enhanced mobile broadband (eMBB) domain. (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput, eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors, mMTC aims ~10 years on battery and/or ~1 million devices/$km^2$, mMTC allows seamless integration of embedded sensors in all areas and is one of the most widely used 5G applications. Potentially by 2020. IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 5 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Figure 6:
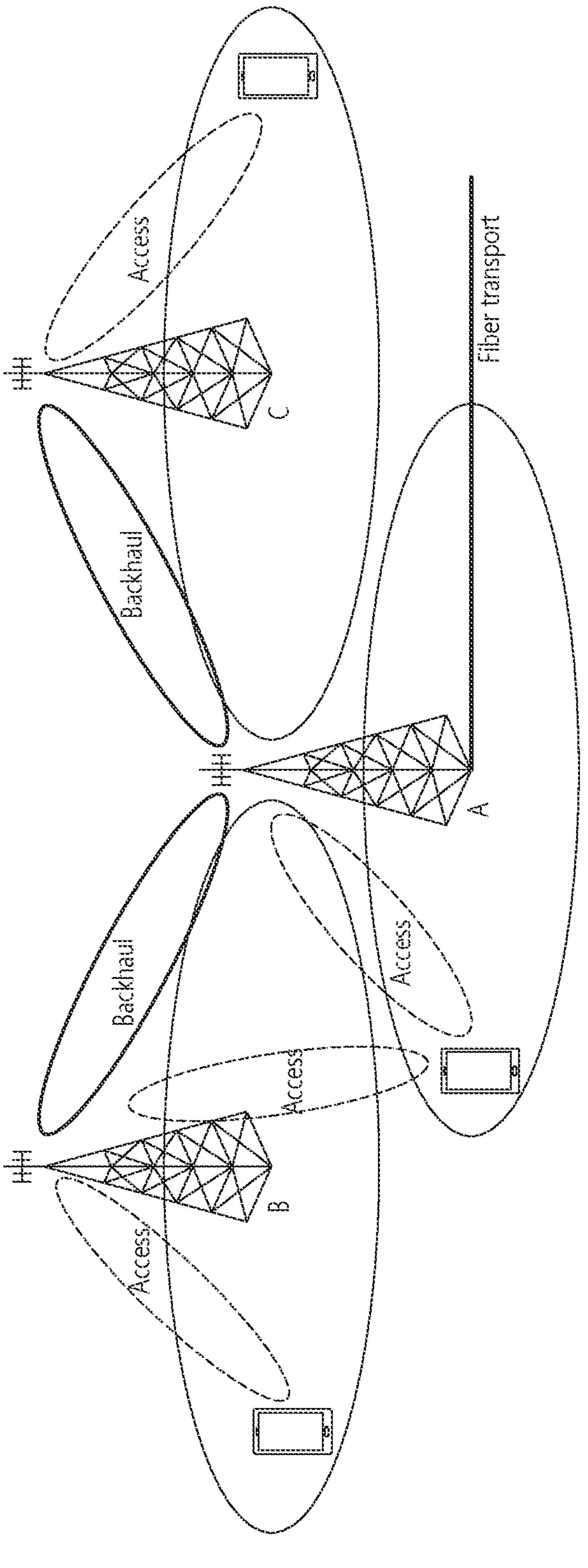
FIG. 6 schematically illustrates an example of integrated access and backhaul links.

FIG. 6 schematically illustrates an example of integrated access and backhaul links.

An example of a network having such integrated access and backhaul links is shown in FIG. 6. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.

Efficient and flexible operation for in-band and out-band relays in indoor and outdoor scenarios Multiple hops and redundant connection End-to-end route selection and optimization Support of backhaul link with high spectrum efficiency Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

Figure 7:
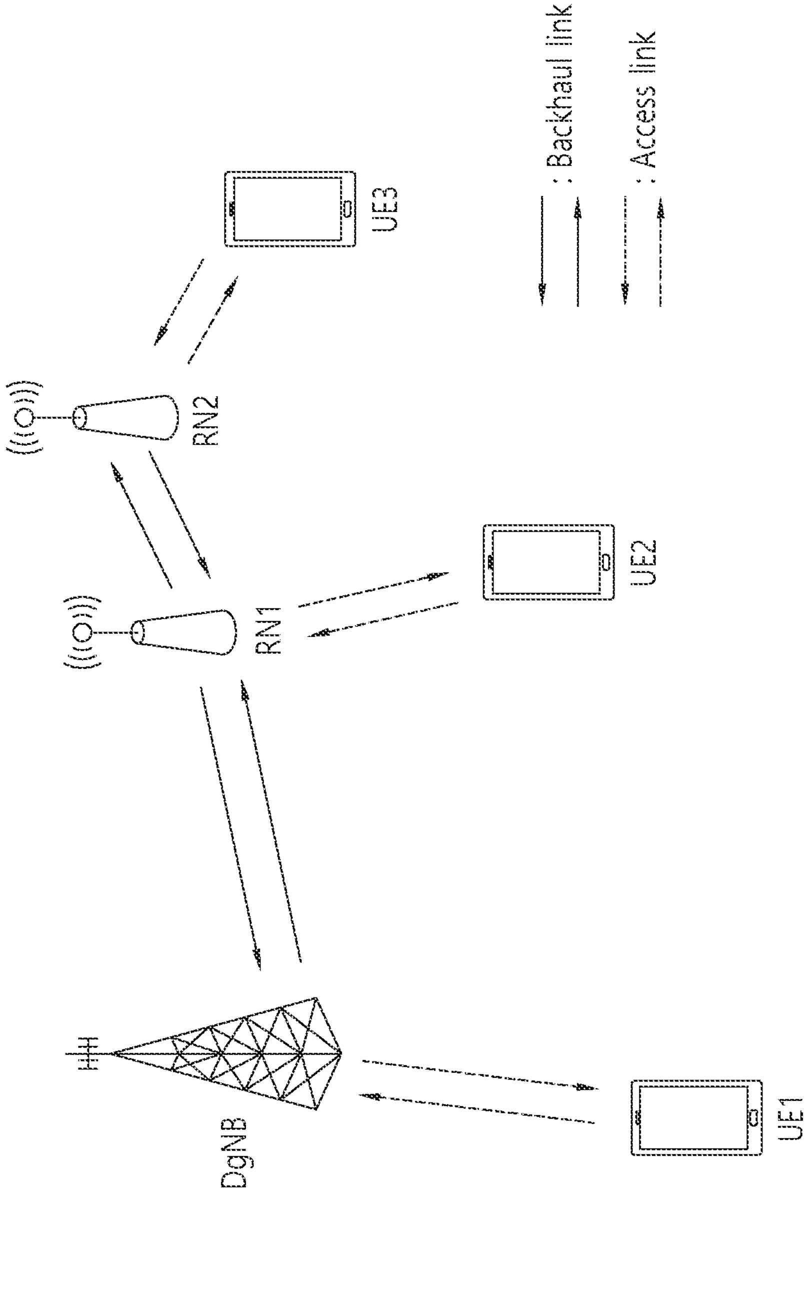
FIG. 7 schematically illustrates an example of a link between a DgNB, an RN, and a UE.

FIG. 7 schematically illustrates an example of a link between a DgNB, an RN, and a UE.

According to FIG. 7, for example, a link between DgNB and UE1 is an access link (access link), a link between RN1 and UE2 is also an access link, and a link between RN2 and UE3 may also mean an access link.

Similarly, according to FIG. 7, for example, a link between DgNB and RN1 and a link between RN1 and RN2 may mean a backhaul link.

For example, backhaul and access links can be configured, and in this case, the DgNB can receive scheduling requests of UE 2 and UE 3 as well as a scheduling request of UE 1. Then, the DgNB can determine scheduling of two backhaul links and three access links and signal the scheduling result. Accordingly, this centralized scheduling includes delayed scheduling and waiting time problems.

On the other hand, distributed scheduling can be performed if each RN has scheduling capability. Then, immediate scheduling can be performed for an uplink scheduling request of a UE and backhaul/access links can be used more flexibly in response to surrounding traffic conditions.

Figure 8:
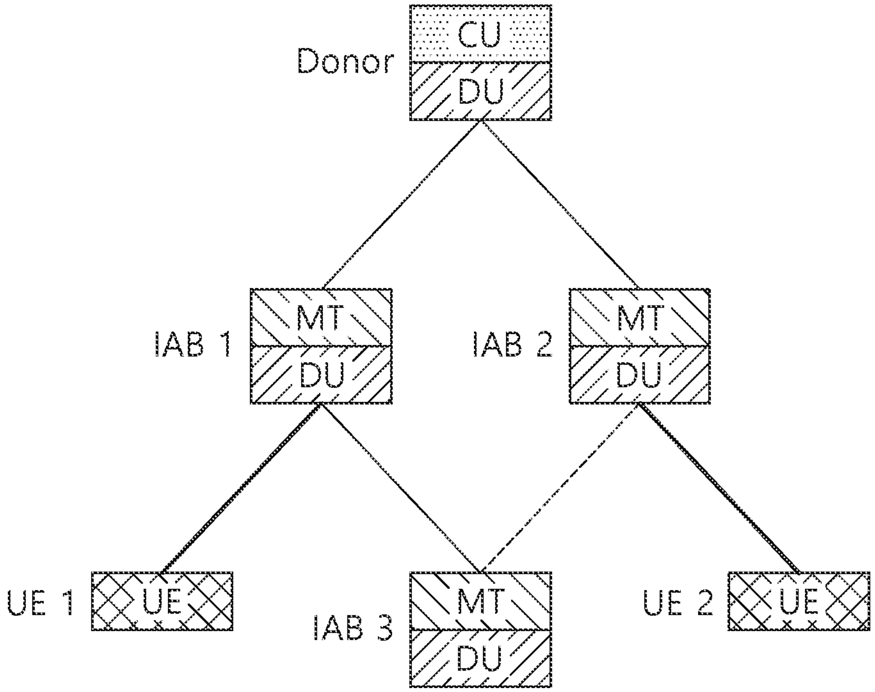
FIG. 8 schematically shows an example of a backhaul link and an access link.

FIG. 8 schematically shows an example of a backhaul link and an access link.

As shown in FIG. 8, a link between a donor node and an IAB node or a link between IAB nodes is called a backhaul link. On the other hand, the link between the donor node and the UE or the link between the IAB node and the UE is called an access link. That is, a link between an MT and a parent DU or a link between a DU and a child MT may be referred to as a backhaul link, and a link between the DU and the UE may be referred to as an access link.

Figure 9:
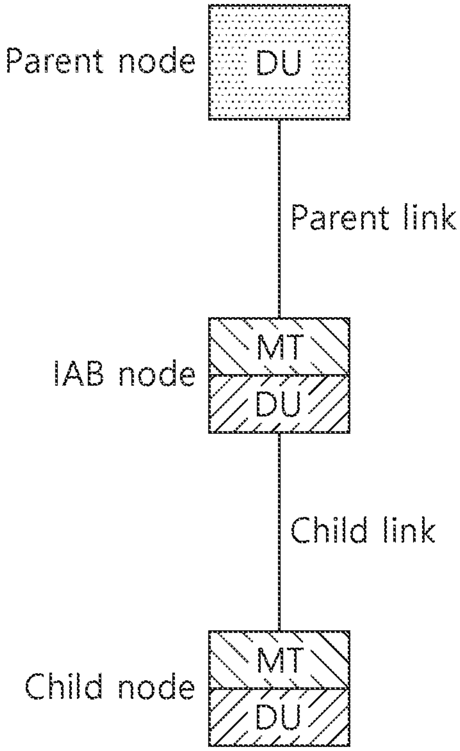
FIG. 9 schematically illustrates an example of a parent link and a child link.

In the existing IAB node, the DU and the MT performed TDM operation through different time resources. On the other hand, it is required to perform resource multiplexing such as SDM/FDM and full duplexing (FD) between the DU and the MT for efficient resource management. The link between the IAB node (IAB MT) and the parent node (parent DU) is referred to as a parent link, as shown in FIG. 9 below; a link between an IAB node (IAB DU) and a child node (child MT) is called a child link. At this time, the TDM operation between the parent link and the child link may be discussed, and the SDM/FDM and FD operation may also be discussed.

FIG. 9 schematically illustrates an example of a parent link and a child link.

As shown in FIG. 9, the link between the IAB node and the parent node is called the parent link, the link between the IAB node and the child node/UE is called the child link. That is, the link between the MT and the parent DU is called a parent link, and the link between the DU and the child MT/UE is called a child link.

However, depending on the interpretation or perspective, the link between the IAB node and the parent node is called a backhaul link, and the link between the IAB node and the child node/UE is also called an access link.

The Tx/Rx timing alignment method of the IAB node that can be considered in the IAB environment may be as follows.

Figure 10:
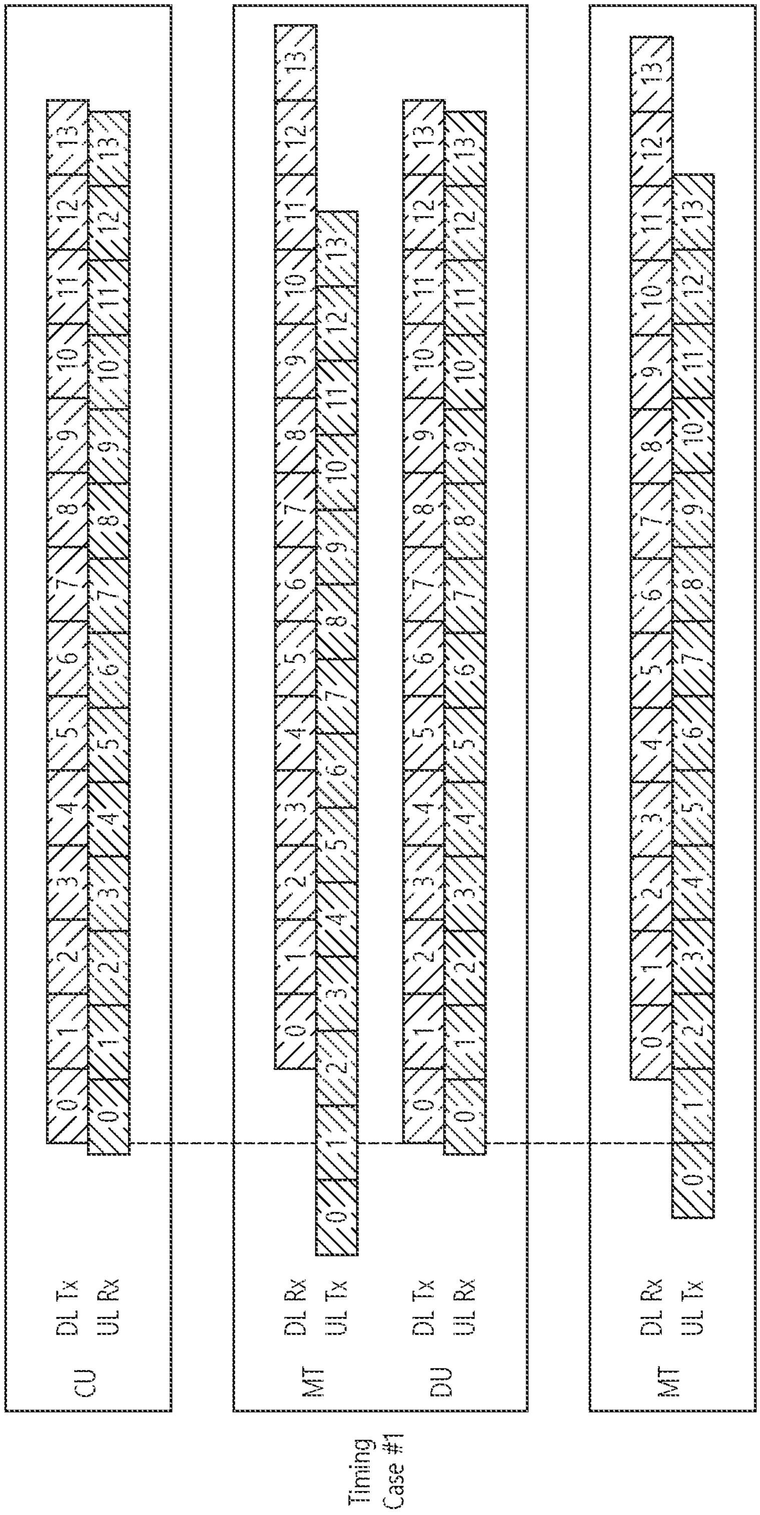
FIG. 10 schematically shows an example of timing alignment case 1.

FIG. 10 schematically shows an example of timing alignment case 1.

Timing Alignment Case 1

DL transmission timing alignment across IAB-node(s) and IAB-donor(s). This is a method in which the DL Tx timing of DUs between IAB nodes is aligned, and is a timing alignment method used by Rel-16 IAB nodes.

If DL TX and UL RX are not well aligned at the parent node, additional information about the alignment is needed for the child node to properly set its DL TX timing for OTA based timing & synchronization.

MT Tx timing may be expressed as MT Rx timing-TA, the DU Tx timing may be expressed as MT Rx timing-TA/2-T_delta. The T_delta value is a value obtained from the parent node.

Figure 11:
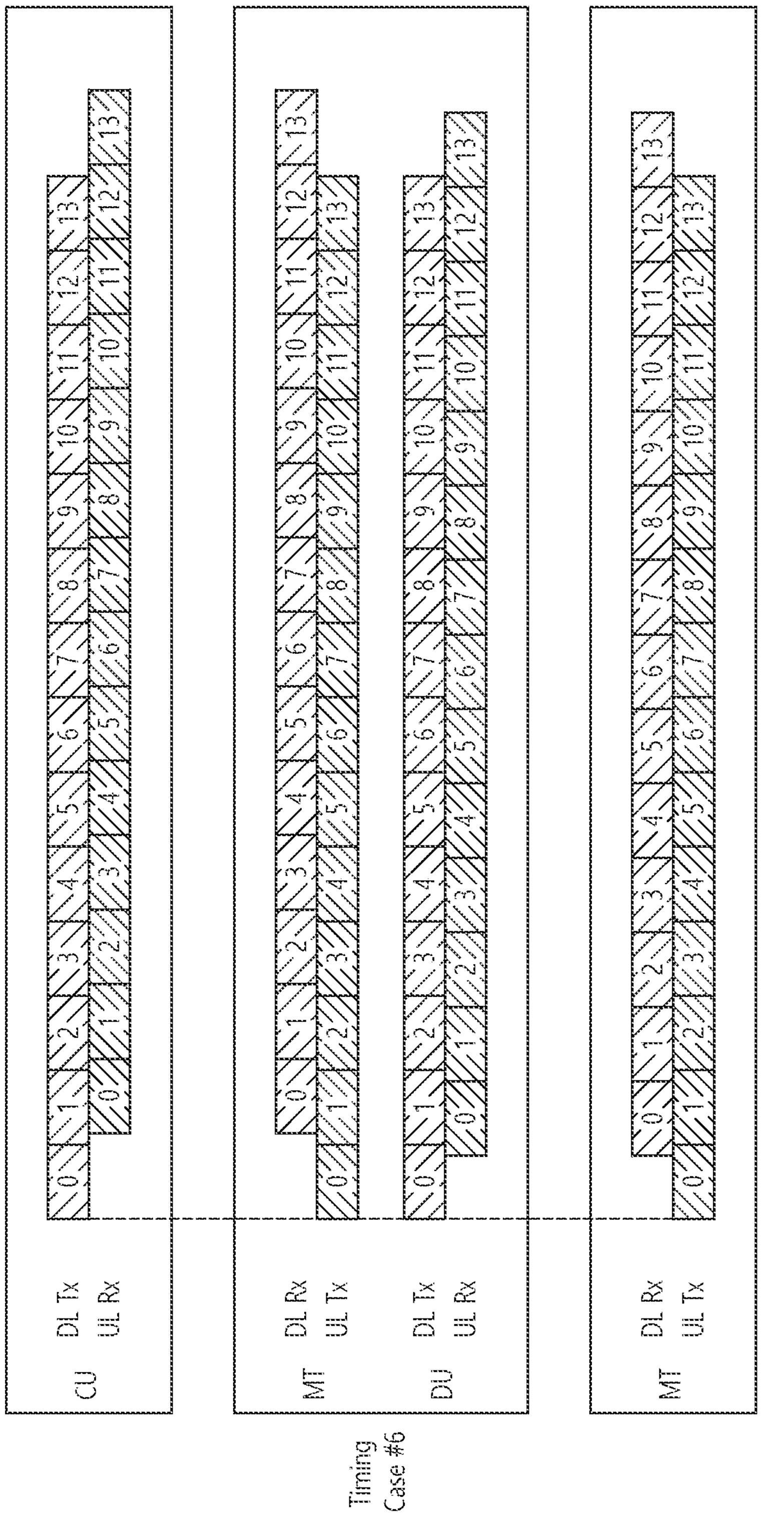
FIG. 11 schematically shows an example of timing alignment case 6.

FIG. 11 schematically shows an example of timing alignment case 6.

Timing Alignment Case 6

The DL transmission timing for all IAB-nodes is aligned with the parent IAB-node or donor DL timing. The UL transmission timing of an IAB-node can be aligned with the IAB-node's DL transmission timing.

This is a method in which the MT UL Tx timing and the DU DL Tx timing of the IAB node are aligned.

Since the UL Tx timing of the MT is fixed, the UL Rx timing of the parent DU receiving it is delayed by the propagation delay of the parent DU and the MT compared to the UL Tx timing of the MT. The UL Rx timing of the MT varies according to the child MT that transmits the UL. When the IAB node uses the timing alignment case 6, since the UL Rx timing of the parent node is different from the existing one, if the IAB node wants to use the timing alignment case 6, the parent node also needs to know the corresponding information.

Figure 12:
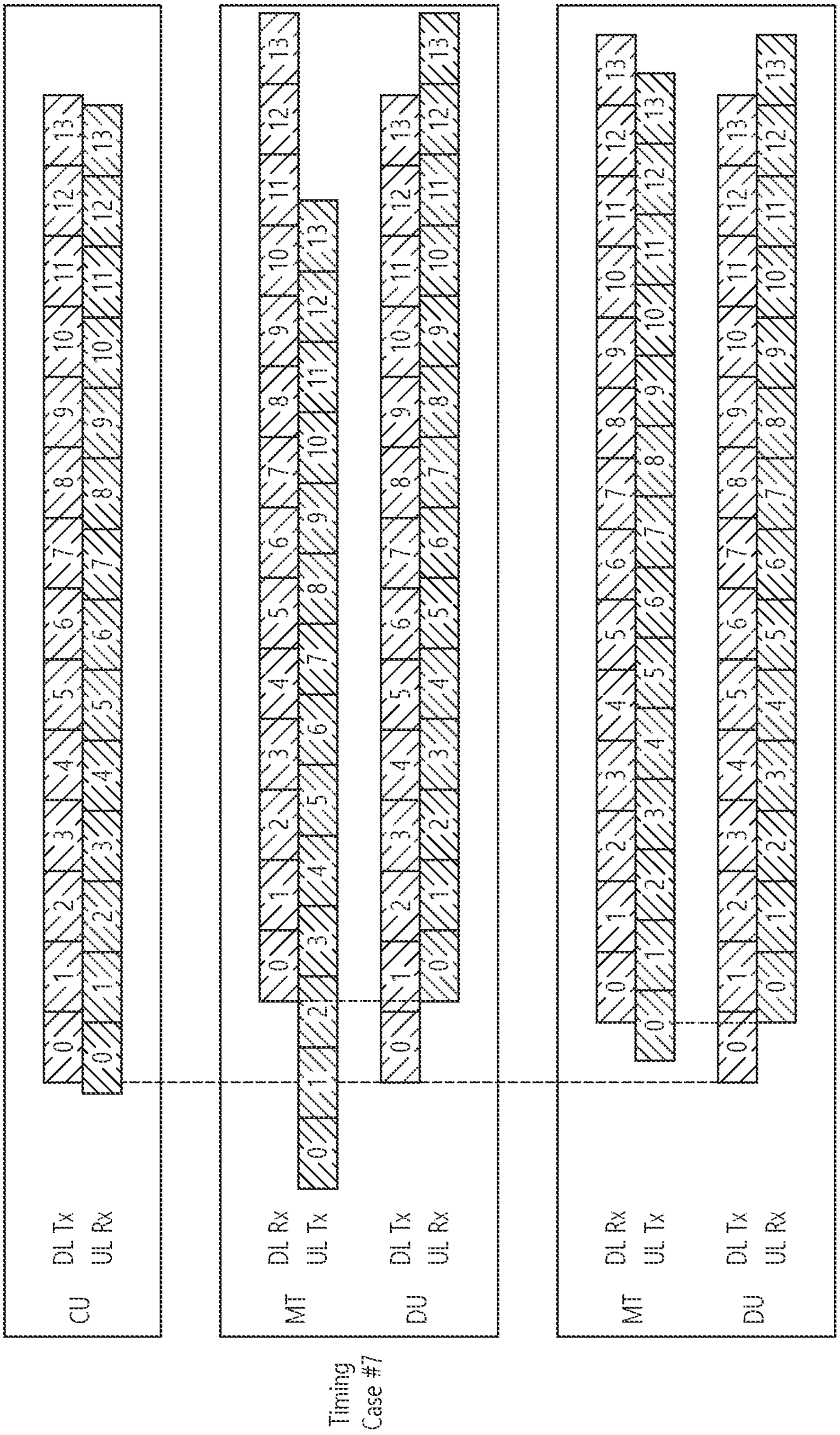
FIG. 12 schematically shows an example of the timing alignment case 7.

FIG. 12 schematically shows an example of the timing alignment case 7.

Timing Alignment Case 7

The DL transmission timing for all IAB-nodes is aligned with the parent IAB-node or donor DL timing. The UL reception timing of an IAB-node can be aligned with the IAB-node's DL reception timing.

If DL TX and UL RX are not well aligned at the parent node, additional information about the alignment is needed for the child node to properly set its DL TX timing for OTA based timing & synchronization.

This is a method in which the MT DL Rx timing and the DU UL Rx timing of the IAB node are aligned.

The transmission/reception timing from the MT perspective is the same as that of the existing IAB node (Rel-16 IAB node), the UL Rx timing of the DU may be aligned with the DL Rx timing of the MT. The IAB node needs to adjust the TA of the child MTs so that the child MTs transmit UL signals according to their UL Rx timing.

Therefore, this timing alignment method may not reveal a difference in the specification operation of the IAB node compared to the existing timing alignment method (case 1). Accordingly, the timing alignment case 7 described herein may be replaced/interpreted as the timing alignment case 1.

Examples for timing alignment cases 1, 6, and 7 are shown in FIGS. 10 to 12, respectively.

In this specification, timing alignment may mean slot-level alignment or symbol-level alignment.

Additional advantages, objects and features of this specification will be set forth in part in the description that follows, and in part will become apparent to those skilled in the art upon review of the following, and may be learned from practice of the specification. The objects and other advantages of the present specification may be realized and attained by the structure particularly pointed out in the description and claims set forth herein, as well as in the appended drawings.

The configuration, operation and other features of the present specification will be understood by the embodiments of the present specification described with reference to the accompanying drawings.

The content of the present specification is described assuming an in-band environment, but may also be applied in an out-band environment. In addition, the content of the present specification is described in consideration of an environment in which a donor gNB (DgNB), a relay node (RN), and a UE perform a half-duplex operation, the contents of the present specification may be applied even in an environment in which a donor gNB (DgNB), a relay node (RN), and/or a UE perform a full-duplex operation.

Meanwhile, various multiplexing options for MT and DU may be discussed. For example, (in IAB WI) asynchronous operation between the MT and the DU may be provided. In addition, simultaneous operation between MT and DU can be provided (in IAB enh WI) to increase spectral efficiency and reduce latency.

In this case, the resource multiplexing between the MT and the DU will be described with reference to the drawings as follows.

Figure 13:
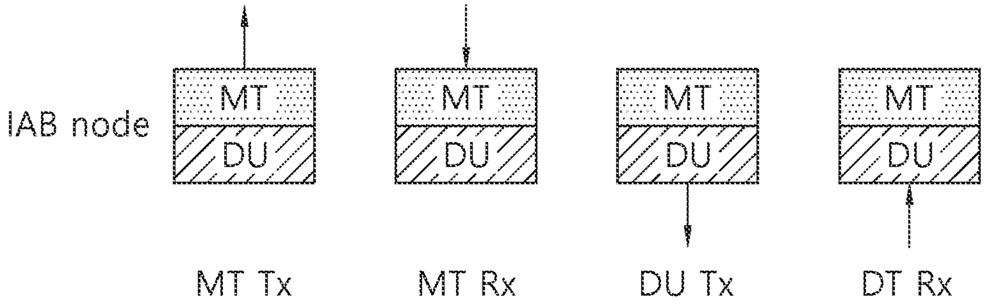
FIGS. 13 and 14 schematically show an example of resource multiplexing between an MT and a DU.
Figure 14:
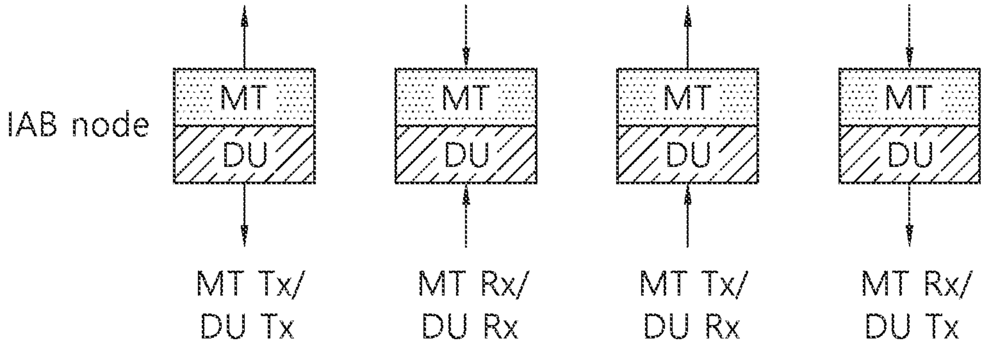

FIGS. 13 and 14 schematically show an example of resource multiplexing between an MT and a DU.

In the case of asynchronous operation, as shown in FIG. 13, the MT and DU may operate in a TDM manner under the per-link half-duplex constraint. And, in the case of simultaneous operation, the MT and the DU may simultaneously perform Tx and/or Rx as shown in FIG. 14.

For simultaneous operation of MT and DU, it can be assumed that MT and DU have independent panels and that the amount of interference between panels is negligible (e.g., MT and DU are assigned separately). In this environment, it can be assumed that the parent link and child link are physically separated, so simultaneous Tx and/or Rx can be performed without interference through the link. Therefore, timing alignment for simultaneous Tx and/or Rx may not be necessary.

Meanwhile, an environment where MT and DU antenna panels are placed together or where MT and DU antenna panels are shared can also be considered. In this case, the impact of interference between parent and child links may need to be considered for simultaneous operation. In this environment, the following multiplexing methods can be considered depending on the combination of transmission directions of MT and DU.

A. MT-Tx/DU-Tx or MT-Rx/DU-Rx (1) SDM

Simultaneous Tx or Rx between MT and DU can be performed in SDM method. For receiver-side SDM, orthogonality between DL DMRS and UL DMRS can be important to successfully separate the two Rx signals. DMRS orthogonality may require timing alignment between MT-Rx and DU-Rx.

When MT and DU receive PDSCH and PUSCH, respectively, DMRS for PDSCH and DMRS for PUSCH can be assigned orthogonally. Therefore, the IAB node can receive two channels simultaneously. However, SDM for other combinations of DL and UL channels may not be appropriate because orthogonal DMRS allocation is not available. Accordingly, SDM for simultaneous reception can be used in limited cases such as PDSCH and PUSCH reception.

(2) FDM

FDM could be another option for simultaneous Tx or Rx between MT and DU within the carrier bandwidth. One important way to ensure that parent and child links utilize different frequency resources may be to separate the frequency resources at the BWP level. For example, when the MT of the IAB node performs uplink transmission within the uplink BWP, the DU of the IAB node can utilize the downlink BWP composed of frequency resources that do not overlap with the MT's uplink BWP.

Even if the frequency resources for the parent link and child link are separated, the received signals of the parent link and child link may interfere with each other depending on the amount of interference emission for adjacent frequency resources. If interference levels are not low enough, Rx timing alignment between MT and DU may be required. However, if the Rx power between the MT and DU is appropriately coordinated and an appropriate amount of guard resources is assumed between the frequency resources of the MT and DU, timing alignment between the MT and DU Rx may not be necessary.

B. Full Duplex for MT-Tx/DU-Rx or MT-Rx/DU-Tx

For simultaneous transmission and reception between MT and DU, intra-device interference (i.e., interference from MT-Tx to DU-Rx or DU-Tx to MT-Rx) should be considered. In case of simultaneous reception, compared to interference between receptions, IAB nodes may experience stronger interference because the transmission signal reaches the receiving antenna without path loss. Therefore, the level of interference for adjacent frequency resources may be much higher than in the case of simultaneous reception. Therefore, such interference can occur not only when MT and DU share frequency resources, but also when they utilize separate frequency resources. To solve the problem of in-device interference, an interference mitigation technique may be performed where timing alignment between DU and MT is a basic requirement.

Below, the proposal of this specification is explained.

This specification proposes a method for applying guard symbols at timing boundaries as the timing mode applied to an IAB node changes.

The timing mode used in this specification refers to the timing case, timing alignment case, etc. described above.

The IAB-node supports multiple multiplexing operation modes such as non-simultaneous operation (TDM) between MT and DU, simultaneous Tx/Tx, simultaneous Tx/Rx, simultaneous Rx/Tx, simultaneous Rx/Rx. At this time, the IAB-node does not continuously operate in only one multiplexing operation mode, but can operate by changing to another multiplexing operation mode depending on time resources. That is, adaptation of the multiplexing operation mode of the IAB-node can be achieved. At this time, as the multiplexing operation of the IAB-node changes, the timing mode applied by the IAB-node may also change depending on time resources. An IAB-node may have timing modes such as timing mode 1, timing mode 6, and/or timing mode 7, and the timing mode applied to the IAB-node may change depending on time resources.

Depending on the timing mode of the IAB-node, all or part of the four timing boundaries: 1) MT DL Rx timing. 2) MT UL Tx timing, 3) DU DL Tx timing, and 4) DU UL Rx timing may vary. At this time, characteristically, only the MT UL Tx timing boundary is different between timing mode 1 and timing mode 6, and other timing boundaries may be the same. Only the DU Rx timing boundary is different between timing mode 1 and timing mode 7, and other timing boundaries may be the same. The MT UL Tx timing boundaries and DU Rx timing boundaries are different between timing mode 6 and timing mode 7, but other timing boundaries may be the same.

A. Guard Symbol(s) for Timing Mode Switching

If the timing mode applied to the IAB-node is changed from timing mode A to timing mode B, overlapping may occur between the timing boundary in timing mode A and the timing boundary in timing mode B.

Figure 15:
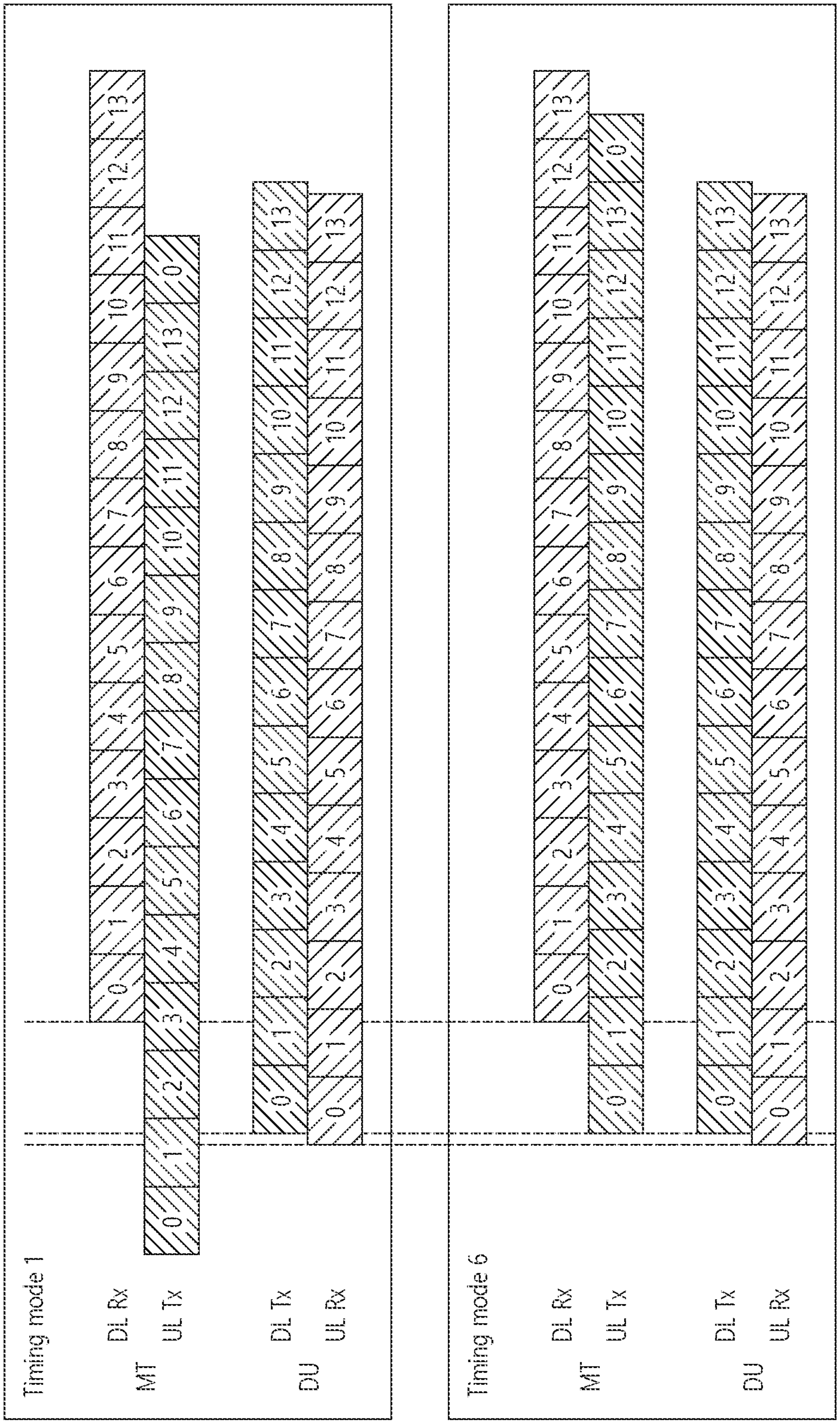
FIG. 15 is a schematic illustration of an example where the UL TX timing of the MT is different when applying timing mode 1 and when applying timing mode 6.

FIG. 15 schematically shows an example in which the UL TX timing of an MT is different when timing mode 1 is applied and when timing mode 6 is applied.

According to FIG. 15, for example, when the IAB-node applies timing mode 1 and timing mode 6, the UL Tx timing of the MT changes as shown in FIG. 15. Generally, the MT UL Tx timing in timing mode 6 is located later than the MT UL Tx timing in timing mode 1, so when the timing mode of the IAB-node changes from timing mode 6 to timing mode 1, overlapping may occur between MT UL Tx timings.

Therefore, when changing the timing mode applied to the IAB-node, it is necessary to place a guard symbol on the MT or DU of the IAB-node to prevent the MT or DU from performing transmission and reception in the guard symbol.

To this end, specifically, when changing the timing mode applied to the MT and DU of the IAB-node, we propose to apply a guard symbol as follows.

1) Guard Symbol Application for MT UL Tx Operation

When the MT of the IAB-node performs a UL Tx operation in timing mode A and then performs a UL Tx operation in timing mode B, the MT determines G_MT MT UL symbols before and/or after switching of the UL Tx operation as guard symbols, and does not perform UL transmission on the guard symbols.

At this time, the value of G_MT may differ depending on the timing mode corresponding to timing mode A and timing mode B as follows.

When switching from timing mode 1 to timing mode 6, the value of G_MT is equal to $G\_MT_{1,6}$.

When switching from timing mode 6 to timing mode 1, the value of G_MT is equal to $G\_MT_{6,1}$.

When switching from timing mode 1 to timing mode 7, the value of G_MT is equal to $G\_MT_{1,7}$.

When switching from timing mode 7 to timing mode 1, the value of G_MT is equal to $G\_MT_{7,1}$.

When switching from timing mode 6 to timing mode 7, the value of G_MT is equal to $G\_MT_{6,7}$.

When switching from timing mode 7 to timing mode 6, the value of G_MT is equal to $G\_MT_{7,6}$.

In this case, the value of the G_MT for each switching case may be the value that the IAB-node receives from the parent DU. For this purpose, the IAB-node may report to the parent DU the desired value of the G_MT for each switching case. Additionally or independently, the MT can determine G_MT as follows.

Characteristically, since the MT Tx timing does not change when switching between timing mode 1 and timing mode 7, the IAB-node can determine that the values of $G\_MT_{1,7}$ and $G\_MT_{7,1}$ are always 0. In this case, for the values of $G\_MT_{1,7}$ and $G\_MT_{7,1}$, the IAB-node may report the desired value to the parent DU, or the IAB-node may not receive the applied value from the parent DU.

In general, since no overlap between MT Tx timings occurs when switching from timing mode 1 to timing mode 6, the IAB-node can determine that the values of $G\_MT_{1,6}$ are always 0. In this case, for the $G\_MT_{1,6}$ values, the IAB-node may report the desired value to the parent DU, or the IAB-node may not receive the applied value from the parent DU.

In general, since no overlap between MT Tx timings occurs when switching from timing mode 7 to timing mode 6, the IAB-node can determine that the values of $G\_MT_{7,6}$ are always 0. In this case, for the $G\_MT_{7,6}$ values, the IAB-node may report the desired value to the parent DU, or the IAB-node may not receive the applied value from the parent DU.

The IAB-node can receive the value for the guard symbol applied when transitioning between MT and DU operations from the parent DU. The number of these guard symbols may vary depending on the switching scenario, as shown in Table 4 below. When the IAB-node applies timing mode 6, the MT's UL Tx timing is set to be the same as the DU's DL Tx timing. In this case, the number of guard symbols required when the MT performs UL Tx operation in timing mode 6 and then performs UL Tx operation in timing mode 1 may be the same as the number of guard symbols required when the MT performs DU Tx operation in timing mode 1, which is the timing mode assumed by Rel-16, and then performs MT Tx operation. Therefore, the IAB-node may determine that the value of $G\_MT_{6,1}$ is equal to NmbGS7, which is the number of guard symbols applied when switching from DU Tx operation to MT Tx operation in Table 4 below. In this case, the IAB-Node may separately report the desired value of $G\_MT_{6,1}$ to the Parent DU, or the IAB-Node may not receive an applied value from the Parent DU.

TABLE 4

| Switching scenario | | Field for number of guard symbols in MAC CE |
|---|---|---|
| IAB-MT operation to IAB-DU operation | MT Rx to DU Tx | $NmbGS_1$ |
| | MT Rx to DU Rx | $NmbGS_2$ |
| | MT Tx to DU Tx | $NmbGS_3$ |
| | MT Tx to DU Rx | $NmbGS_4$ |
| IAB-DU operation to IAB-MT operation | DU Rx to MT Tx | $NmbGS_5$ |
| | DU Rx to MT Rx | $NmbGS_6$ |
| | DU Tx to MT Tx | $NmbGS_7$ |
| | DU Tx to MT Rx | $NmbGS_8$ |

At this time, the MT can determine the positions of G_MT guard symbols as follows. Alt 1. If the MT performs UL Tx operation in timing mode A and then needs to perform UL Tx operation in timing mode B starting from symbol #n, it determines that the G_MT symbols before switching (i.e., symbol #n-G_MT to symbol #n−1) as guard symbols.

Alt 2. If the MT performs UL Tx operation in timing mode A and then needs to perform UL Tx operation in timing mode B starting from symbol #n, it determines that the G_MT symbols after switching (i.e., symbol #n to symbol #n+G_MT−1) as the guard symbol.

Alt 3. If the MT performs UL Tx operation in timing mode A and then needs to perform UL Tx operation in timing mode B starting from symbol #n, it determines that the G_MT symbols that perform TDM operation (i.e., applying timing mode 1 or timing mode 7) at the time of UL Tx operation as guard symbols. In other words, for example, if an MT performs UL Tx operation in timing mode 1 and then needs to perform UL Tx operation in timing mode 6 from symbol #n onwards, the G_MT symbol before the switch to timing mode 1 (i.e. symbol #n-G_MT to symbol #n−1) is determined to be the guard symbol. On the other hand, if the MT performs UL Tx operation in timing mode 6 and then needs to perform UL Tx operation in timing mode 1 from symbol #n onwards, the G_MT symbol after switching to timing mode 1 (i.e., symbol #n to symbol #n+G_MT−1) is determined to be the guard symbol.

Alt 4. If the MT performs UL Tx operation in timing mode A and then needs to perform UL Tx operation in timing mode B starting from symbol #n, it determines that the G_MT symbols that perform non-TDM operation (i.e., apply timing mode 6) at the time of UL Tx operation as guard symbols. In other words, for example, if an MT performs UL Tx operation in timing mode 6 and then needs to perform UL Tx operation in timing mode 1 from symbol #n onward, the G_MT symbol before the switch to timing mode 6 (i.e., symbol #n-G_MT to symbol #n−1) is determined to be the guard symbol. On the other hand, if the MT performs UL Tx operation in timing mode 1 and then needs to perform UL Tx operation in timing mode 6 starting from symbol #n, the G_MT symbols after the switch to timing mode 6 (i.e., symbol #n to symbol #n+G_MT−1) are determined as guard symbols.

2) Application of Guard Symbol for DU UL Rx Operation

When a DU of an IAB-node performs UL Rx operation in timing mode A and then performs UL Rx operation in timing mode B, the DU determines that G_DU DU UL symbols before and/or after the switching of UL Rx operation are guard symbols and does not perform UL reception on those guard symbols.

At this time, the value of G_DU may differ depending on the timing mode corresponding to timing mode A and timing mode B as follows.

When switching from timing mode 1 to timing mode 6, the value of G_DU is equal to $G\_DU_{1,6}$.

When switching from timing mode 6 to timing mode 1, the value of G_DU is equal to $G\_DU_{6,1}$.

When switching from timing mode 1 to timing mode 7, the value of G_DU is equal to $G\_DU_{1,7}$.

When switching from timing mode 7 to timing mode 1, the value of G_DU is equal to $G\_DU_{7,1}$.

When switching from timing mode 6 to timing mode 7, the value of G_DU is equal to $G\_DU_{6,7}$.

When switching from timing mode 7 to timing mode 6, the value of G_DU is equal to $G\_DU_{7,6}$.

In this case, the value of the G_DU for each switching case may be the value that the IAB-node receives from the parent DU. For this purpose, the IAB-node may report to the parent DU the desired value of the G_DU for each switching case.

In this case, the IAB-node can determine that the values of $G\_DU_{1,6}$ and $G\_DU_{6,1}$ are always 0, since characteristically the DU Rx timing does not change when switching between timing mode 1 and timing mode 6. In this case, for the values $G\_MT_{1,6}$ and $G\_MT_{6,1}$, the IAB-node may report the desired value to the parent DU, or the IAB-node may not receive an enforced value from the parent DU.

At this time, the DU can determine the positions of G_DU guard symbols as follows.

Alt 1. If the DU performs UL Rx operation in timing mode A and then needs to perform UL Rx operation in timing mode B starting from symbol #n, it determines the G_DU symbols before the switching (i.e., symbol #n-G_DU to symbol #n−1) as guard symbols.

Alt 2. If the DU performs UL Rx operation in timing mode A and then needs to perform UL Rx operation in timing mode B starting from symbol #n, the DU determines the G_DU symbols after switching (i.e., symbol #n to symbol #n+G_MT−1) as guard symbols.

Alt 3. If the DU performs UL Rx operation in timing mode A and then needs to perform UL Rx operation in timing mode B starting from symbol #n, the DU determines the G_DU symbols that perform TDM operation (i.e., apply timing mode 1 or timing mode 6) at the time of UL Rx operation as guard symbols. In other words, for example, if a DU performs UL Rx operation in timing mode 1 and then needs to perform UL Rx operation in timing mode 7 from symbol #n onwards, the G_DU symbols before the switching to timing mode 1 (i.e. symbol #n-G_DU to symbol #n−1) are determined to be guard symbols. On the other hand, if a DU performs UL Rx operation in timing mode 7 and then needs to perform UL Rx operation in timing mode 1 starting from symbol #n, the G_DU symbols after switching to timing mode 1 (i.e., symbol #n to symbol #n+G_DU−1) are determined as guard symbols.

Alt 4. If a DU performs UL Rx operation in timing mode A and then needs to perform UL Rx operation in timing mode B starting from symbol #n, the DU determines that the G_DU symbols that perform non-TDM operation (i.e., apply timing mode 7) during UL Rx operation are guard symbols. In other words, for example, if a DU performs UL Rx operation in timing mode 6 and then needs to perform UL Rx operation in timing mode 1 from symbol #n onwards, the G_DU symbols before the switching to timing mode 7 (i.e. symbol #n-G_DU to symbol #n−1) are determined to be guard symbols. On the other hand, if the DU performs UL Rx operation in timing mode 1 and then needs to perform UL Rx operation in timing mode 7 starting from symbol #n, the G_DU symbols after the switching to timing mode 7 (i.e., symbol #n to symbol #n+G_DU−1) are determined as guard symbols.

B. Guard Symbol(s) for DU/MT Transition

Hereinafter, before providing a detailed description of the present specification, the concept of transmitting and/or receiving information about guard symbols between a node and a parent node will first be explained in this specification.

Hereinafter, for a better understanding of the examples of the present disclosure, the disclosure will be described with reference to drawings. The following drawings are intended to illustrate specific examples of the present disclosure. The names of specific devices or the names of specific signals/messages/fields shown in the drawings are for illustrative purposes only, and the technical features of the present disclosure are not limited to the specific names used in the drawings.

Figure 16:
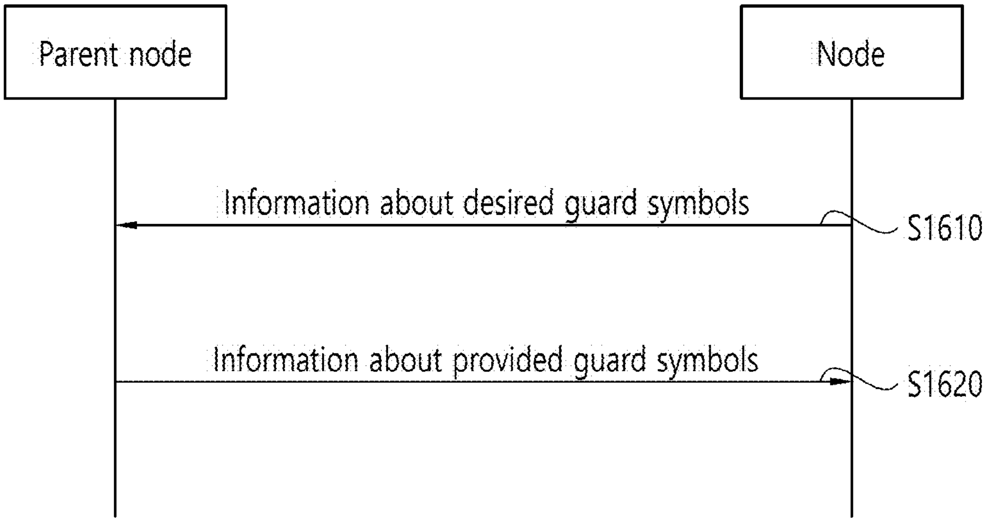
FIG. 16 is a flowchart of a method for transmitting and/or receiving information about guard symbols.

FIG. 16 is a flowchart of a method for transmitting and/or receiving information about guard symbols.

According to FIG. 16, the node can transmit Information about desired guard symbols to the parent node (S1610). In other words, the information about the guard symbol transmitted by the node to the parent node may be, for example, 'Information about desired guard symbols', and the 'Information about desired guard symbols' may be, for example, 'Desired Guard Symbols MAC CE' sent via MAC CE.

Such example may have the same/similar form as the example in Table 4 described above. In other words, as described above, the Information about desired guard symbols may be subject to the embodiments of Table 4, with more specific embodiments being as described above (and hereinafter), and for ease of description, repetition of redundant content will be omitted.

The node may receive information about provided guard symbols from the parent node (S1620). That is, the information about guard symbols that the node receives from the parent node may be, for example, 'information about provided guard symbols', and the 'information about provided guard symbols' may be, for example, 'Provided Guard Symbols MAC CE' received via MAC CE.

In this case, the example may have the same/similar form as the example in Table 4 described above. In other words, as described above, the information about the guard symbols provided may be subject to the embodiments of Table 4, with more specific embodiments being as described above (and hereinafter), and for ease of description, repetition of redundant content will be omitted.

Here, the sequential relationship between Information about provided guard symbols and Information about desired guard symbols, shown in FIG. 16, corresponds to an example. That is, the information about provided guard symbols may be transmitted after the Information about desired guard symbols, and the information about provided guard symbols may be transmitted before the Information about desired guard symbols. Alternatively, the information about provided guard symbols may be transmitted separately, without correlation with the Information about desired guard symbols.

To summarize, with respect to IAB operation, the MAC entity of an IAB-DU or IAB-Donor-DU may reserve a sufficient number of symbols at the beginning and/or end of a slot (where the child IAB node transitions its operation from the IAB-DU to the IAB-MT function and vice versa).

At this time, the MAC entity on the IAB-DU or IAB-donor-DU can inform the child node of the number of guard symbols provided through 'Provided Guard Symbols MAC CE'. And, the IAB-MT on the child node can inform the parent IAB-DU or IAB-donor-DU of the desired number of guard symbols through 'Desired Guard Symbols MAC CE'.

In other words, with respect to the serving cell of the IAB-MT, the IAB-MT may be provided by the 'Provided Guard Symbols MAC CE' with a number of symbols in a slot (in this slot, the IAB node transitions between the IAB-MT and the IAB node DU) that will not be used by the IAB-MT.

On the other hand, as described earlier, Information about desired guard symbols and/or information about provided guard symbols may be transferred as a MAC CE (and/or as an RRC). Additionally: an embodiment in which a node transmits information about a desired guard symbol to a parent node and an embodiment in which a node receives information about provided guard symbols from a parent node can be implemented independently or together.

Hereinafter, 'information about provided guard symbols' according to an embodiment of the present specification will be described in more detail.

Here, in this specification, for convenience of explanation, 'information about provided guard symbols', 'Provided Guard Symbols MAC CE', and 'guard-SymbolsProvided' may be used interchangeably, That is, 'guard-SymbolsProvided' described below can be understood as, for example, 'information about provided guard symbols' or 'Provided Guard Symbols MAC CE'.

And, in this specification, for convenience of explanation, 'timing mode 1', 'timing alignment case 1', and 'timing case 1' may be used interchangeably, Additionally, 'Timing Mode 6', 'Timing Alignment Case 6', and 'Timing Case 6' can be used interchangeably. In addition, 'Timing Mode 7', 'Timing Alignment Case 7', and 'Timing Case 7' can be used interchangeably.

The IAB-node may receive values from the parent DU for guard symbols that are applied during the transition between MT and DU operation. The number of these guard symbols can be set independently depending on the switching scenario, as shown in Table 4. This configuration information is called guard-SymbolsProvided.

On the other hand, even if an IAB-Node operates in timing mode 6 or timing mode 7, which are timing modes for simultaneous operations, the IAB-Node may not always perform simultaneous operations. If the MT and DU of an IAB-node are operating in a resource direction that does not allow simultaneous operation, or even if they are operating in timing mode 6 or timing mode 7 due to interference, power limitations, etc., only the MT or DU may need to operate in TDM mode, Therefore, in these cases, a transition between MT and DU operation occurs, and overlapping of timing boundaries may occur at the time of the transition because the MT Tx timing, MT Rx timing, DU Tx timing, and DU Rx timing may not match each other, Therefore, when transitioning between MT and DU operation, the IAB-node applies a portion of the pre- and post-transition MT symbols as guard symbols to avoid sending and receiving of the MT.

If the IAB-node operates in a timing mode other than the existing timing mode 1, the timing relationship between MT Tx timing, MT Rx timing, DU Tx timing, and DU Rx timing will be different than the timing relationship when the IAB-node operates in timing mode 1. Therefore, the number of guard symbols required when operating in a timing mode other than timing mode 1 may differ from the number of guard symbols previously set.

Therefore, an IAB-node needs to determine the number of guard symbols that apply during the transition of MT/DU operation when operating in a timing mode other than the existing timing mode 1. For this purpose, we propose a method to determine the amount of guard symbols applied when an IAB-node operates in timing mode 6 or timing mode 7.

Hereinafter, for a better understanding of the examples of the present disclosure, the disclosure will be described with reference to drawings. The following drawings are intended to illustrate specific examples of the present disclosure. The names of specific devices or the names of specific signals/messages/fields shown in the drawings are for illustrative purposes only, and the technical features of the present disclosure are not limited to the specific names used in the drawings.

In the following example, basically the content described in FIG. 16 described above can be applied.

Figure 17:
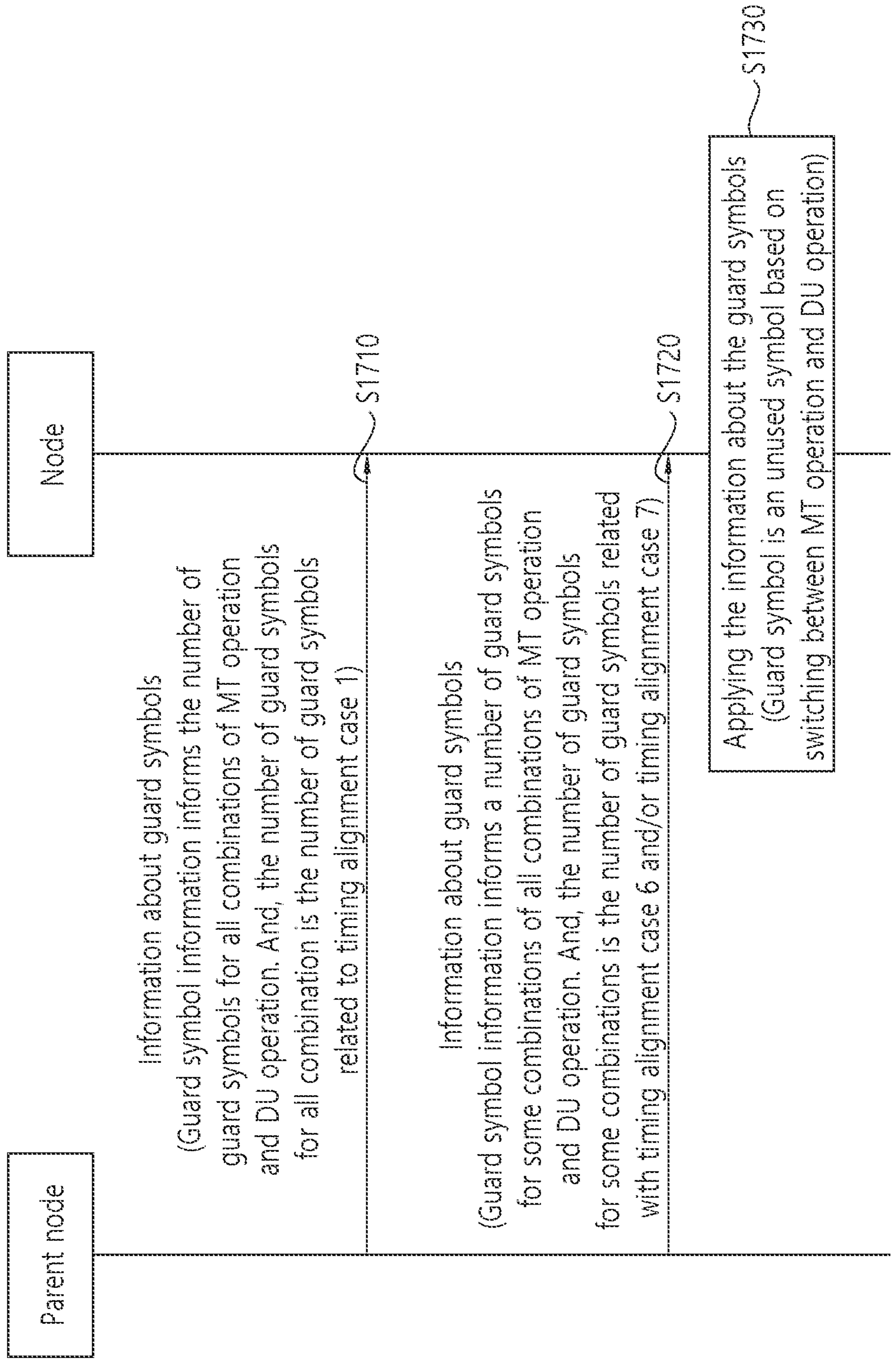
FIG. 17 is a flowchart of a method of receiving guard symbol information, according to one embodiment of the present disclosure.

FIG. 17 is a flowchart of a method for receiving guard symbol information, according to one embodiment of the present disclosure.

According to FIG. 17, a node may receive information about guard symbols from a parent node (or donor) (S1710).

Here, the guard symbol information can inform the number of guard symbols for all combinations of MT operation and DU operation. And, the number of guard symbols for all combination may be the number of guard symbols related to timing alignment case 1.

The guard symbol information in this case may be the same as the example in the preceding Table 4, and the example in the preceding Table 4 may be restated here for ease of specification understanding. Table 5 is an example of a switching scenario and related guard symbol(s) for the Case-1 timing mode.

TABLE 5

| Switching scenario | | Field for number of guard symbols in MAC CE |
|---|---|---|
| IAB-MT operation to IAB-DU operation | MT Rx to DU Tx | $NmbGS_1$ |
| | MT Rx to DU Rx | $NmbGS_2$ |
| | MT Tx to DU Tx | $NmbGS_3$ |
| | MT Tx to DU Rx | $NmbGS_4$ |
| IAB-DU operation to IAB-MT operation | DU Rx to MT Tx | $NmbGS_5$ |
| | DU Rx to MT Rx | $NmbGS_6$ |
| | DU Tx to MT Tx | $NmbGS_7$ |
| | DU Tx to MT Rx | $NmbGS_8$ |

The node may receive information about guard symbols from the parent node (or donor) (S1720). Here, the guard symbol information may inform a number of guard symbols for some combinations of all combinations of MT operation and DU operation. And, the number of guard symbols for some combinations may be the number of guard symbols related with timing alignment case 6 and/or timing alignment case 7.

To summarize, for Case-6 and Case-7 timing modes, values for the number of separate guard symbols can be specified for each of the following eight switching scenarios.

TABLE 6

| Switching scenario | | Field for number of guard symbols in MAC CE |
|---|---|---|
| IAB-MT operation to IAB-DU operation | MT Tx (Case-6) to DU Tx (Case-1) | $NmbGS_9$ |
| | MT Tx (Case-6) to DU Rx (Case-1) | $NmbGS_{10}$ |
| | MT Tx (Case-7) to DU Tx (Case-1) | $NmbGS_{11}$ |
| | MT Tx (Case-7) to DU Rx (Case-1) | $NmbGS_{12}$ |
| IAB-DU operation to IAB-MT operation | DU Tx (Case-1) to MT Tx (Case-6) | $NmbGS_{13}$ |
| | DU Rx (Case-1) to MT Tx (Case-6) | $NmbGS_{14}$ |
| | DU Tx (Case-1) to MT Tx (Case-7) | $NmbGS_{15}$ |
| | DU Rx (Case-1) to MT Tx (Case-7) | $NmbGS_{16}$ |

At this point, the example for timing alignment case 6 can be summarized as follows.

TABLE 7

| Switching scenario | | Field for number of guard symbols in MAC CE |
|---|---|---|
| IAB-MT operation to IAB-DU operation | MT Tx (Case-6) to DU Tx (Case-1) | $NmbGS_9$ |
| | MT Tx (Case-6) to DU Rx (Case-1) | $NmbGS_{10}$ |
| IAB-DU operation to IAB-MT operation | DU Tx (Case-1) to MT Tx (Case-6) | $NmbGS_{13}$ |
| | DU Rx (Case-1) to MT Tx (Case-6) | $NmbGS_{14}$ |

At this time, an example of timing alignment case 7 may be summarized as follows.

TABLE 8

| Switching scenario | | Field for number of guard symbols in MAC CE |
|---|---|---|
| IAB-MT operation to IAB-DU operation | MT Tx (Case-7) to DU Tx (Case-1) | $NmbGS_{11}$ |
| | MT Tx (Case-7) to DU Rx (Case-1) | $NmbGS_{12}$ |
| IAB-DU operation to IAB-MT operation | DU Tx (Case-1) to MT Tx (Case-7) | $NmbGS_{15}$ |
| | DU Rx (Case-1) to MT Tx (Case-7) | $NmbGS_{16}$ |

Afterwards, the node may apply the information about the guard symbols (S1730). Here, the guard symbol may be an unused symbol based on switching between MT operation and DU operation. In other words, when the node receives the 'Provided Guard Symbols MAC CE', the MAC entity (of the node) may instruct (or inform) the sublayer (of the node) of the number of provided guard symbols and/or the SCS configuration for the indicated serving cell.

Here, according to embodiments of the present specification, the "guard symbol information for timing alignment case 1" and the "guard symbol information for timing alignment case 6 and/or timing alignment case 7" may be transmitted separately. Also, according to embodiments of the present specification, the "guard symbol information for timing alignment case 1" and the "guard symbol information for timing alignment case 6 and/or timing alignment case 7" may be transmitted simultaneously (e.g., as one piece of information or as a plurality of pieces of information).

Hereinafter, an example of timing alignment case 6 will be described in more detail, focusing on the timing alignment case 6. In the following example, basically the content described in FIGS. 16 and 17 described above can be applied.

Figure 18:
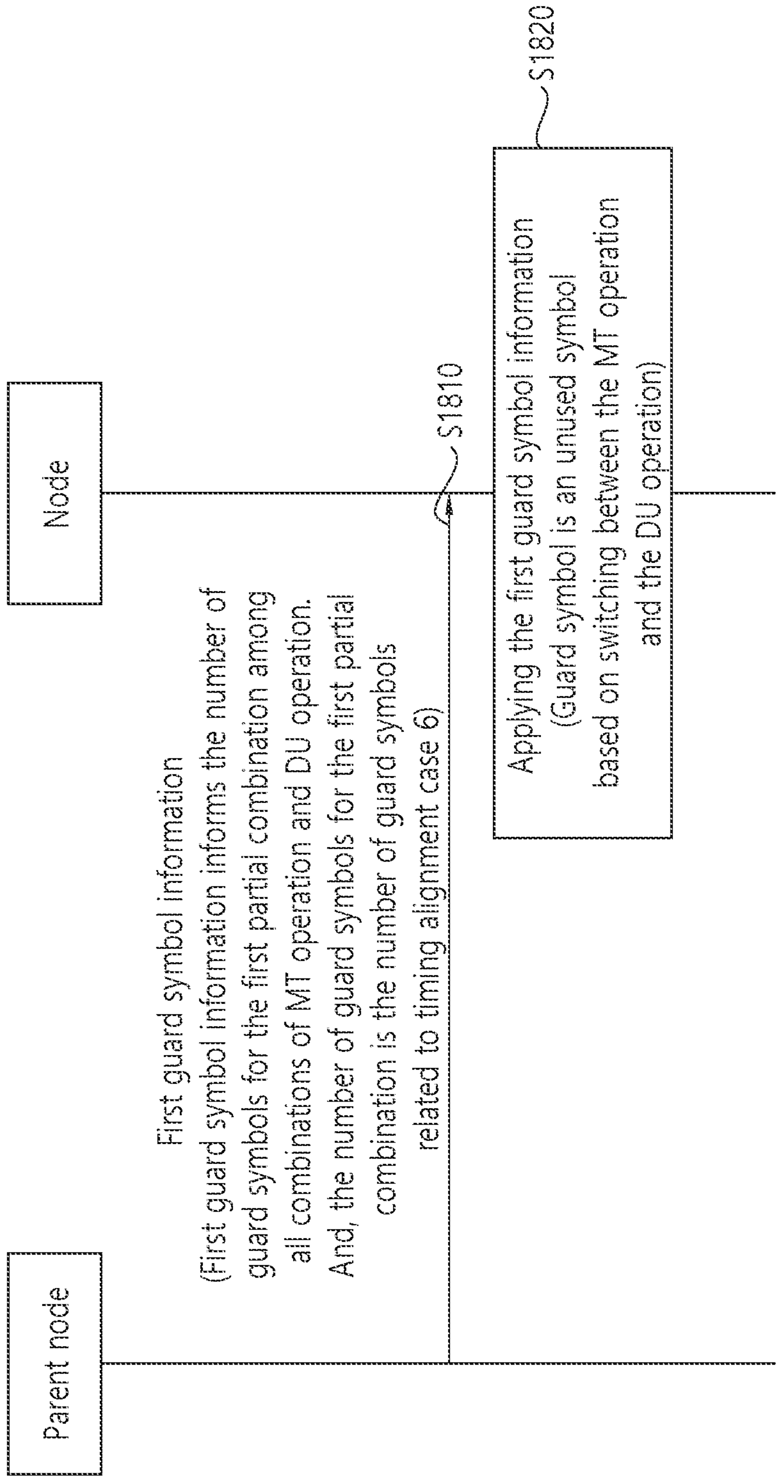
FIG. 18 is a flowchart of a method of receiving first guard symbol information performed by a node in a wireless communication system, according to one embodiment of the present disclosure.

FIG. 18 is a flowchart of a method for receiving first guard symbol information performed by a node in a wireless communication system, according to an embodiment of the present specification.

According to FIG. 18, the node can receive first guard symbol information (S1810). The node may be an integrated access and backhaul (IAB) node.

Here, the first guard symbol information may inform the number of guard symbols for the first partial combination among all combinations of mobile terminal (MT) operation and distributed unit (DU) operation. And, the number of guard symbols for the first partial combination may be the number of guard symbols related to timing alignment case 6. The MT operation may include at least one of MT transmission (TX) and MT reception (RX), and the DU operation may include at least one of DU TX and DU RX.

At this time, specific examples of the first guard symbol information are as described in Tables 6 and 7 described above.

That is, the number of guard symbols for the first partial combination may include the number of guard symbols for transition from MT TX for timing alignment case 6 to DU TX for timing alignment case 1, the number of guard symbols for transition from MT TX for timing alignment case 6 to DU RX for timing alignment case 1, the number of guard symbols for the transition from DU TX for timing alignment case 1 to MT TX for timing alignment case 6, and the number of guard symbols for transition from DU RX for timing alignment case 1 to MT TX for timing alignment case 6.

Afterwards, the node can apply the first guard symbol information (S1820). Here, the guard symbol may be an unused symbol based on switching between the MT operation and the DU operation.

Additionally, as previously described, according to FIG. 18, the node may receive information related to the number of guard symbols related with the timing alignment case 7. That is, the first guard symbol information received by the node may inform the number of guard symbols for a second partial combination of all combinations of the MT operation and the DU operation. And, the number of guard symbols for the second partial combination may be the number of guard symbols related with the timing alignment case 7.

Further, as previously described, according to FIG. 18, the node may also receive information related to the number of guard symbols related with timing alignment case 1. That is, the node receives a second guard symbol information, the second guard symbol information indicating the number of guard symbols for the MT operation and the all combination of operations, and the number of guard symbols for the all combination may be the number of guard symbols related with timing alignment case 1.

Meanwhile, as described above, according to FIG. 18, the node may support at least one of timing alignment case 1, the timing alignment case 6, and timing alignment case 7.

And, as described above, in timing alignment case 1, the node can determine the time of MT TX (transmission) based on provided timing advance (TA) information. And, in the timing alignment case 6, the node can determine the time of MT TX (transmission) based on the time of the DU TX for the node. Additionally, in timing alignment case 7, the node may determine the time of MT TX (transmission) based on both provided timing advance (TA) information and additional TA information.

Hereinafter, the examples described so far will be described in more detail.

- Alt 1. Depending on the timing mode applied by the IAB-node, information about the number of guard symbols can be set independently of guard-SymbolsProvided set in the existing Rel-16. That is, independent guard-SymbolsProvided can be set for timing mode 6 and/or timing mode 7 independently of the existing guard-SymbolsProvided. In this case, the IAB-node determines the number of guard symbols by applying the corresponding guard-SymbolsProvided setting according to the timing mode it applies.
- Alt 2. Depending on the timing mode applied by the IAB-node, information about the number of guard symbols can be additionally set independently of guard-SymbolsProvided set in the existing Rel-16. In this case, the setting for the number of guard symbols applied when operating in timing mode 6 and/or timing mode 7 can be additionally set for only some of the existing eight switching scenarios.

For example, the first guard symbol information may indicate the number of guard symbols for a first partial combination of all combinations of mobile terminal (MT) operation and distributed unit (DU) operation. And, the number of guard symbols for the first partial combination may be the number of guard symbols related to timing alignment case 6.

Specifically, when timing mode 6 is applied, only the MT Tx timing is different compared to when timing mode 1 is applied. Therefore, of the eight switching scenarios shown in Table 4, only information about the number of guard symbols for the four switching scenarios related with MT Tx (i.e., MT Tx to DU Tx, MT Tx to DU Rx, DU Rx to MT Tx, and DU Tx to MT Tx) can be further configured. In this case, for the four switching scenarios associated with MT Tx (i.e., MT Tx to DU Tx, MT Tx to DU Rx, DU Rx to MT Tx, and DU Tx to MT Tx), the terminal determines the number of guard symbols additionally set as the number of guard symbols applied, and for the remaining four switching scenarios not involving MT Tx (i.e., MT Rx to DU Tx, MT Rx to DU Rx, DU Rx to MT Rx, and DU Tx to MT Rx), the number of guard symbols set in guard-SymbolsProvided, which is set in existing Rel-16, can be determined as the number of guard symbols applied.

For example, the first guard symbol information may inform the number of guard symbols for a second partial combination among all combinations of the MT operation and the DU operation. And, the number of guard symbols for the second partial combination may be the number of guard symbols related to timing alignment case 7.

Specifically, when timing mode 7 is applied, only the DU Rx timing is different compared to when timing mode 1 is applied. Therefore, of the eight switching scenarios shown in Table 4, only information about the number of guard symbols for the four switching scenarios associated with DU Rx (i.e., MT Rx to DU Rx, MT Tx to DU Rx, DU Rx to MT Tx, and DU Rx to MT Rx) can be further configured. In this case, for the four switching scenarios associated with DU Rx (i.e., MT Rx to DU Rx, MT Tx to DU Rx, DU Rx to MT Tx, and DU Rx to MT Rx), the terminal determines the number of guard symbols additionally set as the number of guard symbols applied, and for the remaining four switching scenarios not involving DU Rx (i.e., MT Rx to DU Tx, MT Tx to DU Tx, DU Tx to MT Tx, and DU Tx to MT Rx), the number of guard symbols set in guard-SymbolsProvided, which is set in existing Rel-16, can be determined as the number of guard symbols applied.

- Alt 3. When the IAB-node operates in timing mode 6, the MT Tx timing and DU Tx timing are set to be the same. Therefore, a guard symbol may not be needed when switching between MT Tx and DU Tx. In view of this, it can be determined that when the IAB-node is operating in timing mode 6, the number of guard symbols is equal to zero in the switching scenarios of MT Tx to DU Tx and DU Tx to MT Tx in addition to the method of Alt 1 or the method of Alt 2. In this case, the number of guard symbols for the cases of MT Tx to DU Tx and DU Tx to MT Tx may not be set in the configuration information for the number of guard symbols applied when operating in timing mode 6.

Additionally/independently, when the IAB-node is operating in timing mode 7, the MT Rx timing and DU Rx timing may be set to the same. Therefore, a guard symbol may not be needed when switching between MT Rx and DU Rx. In view of this, it can be determined that when the IAB-node is operating in timing mode 7, the number of guard symbols is equal to zero in the switching scenarios of MT Rx to DU Rx and DU Rx to MT Rx in addition to the method of Alt 1 or the method of Alt 2. In this case, the number of guard symbols for the MT Rx to DU Rx and DU Rx to MT Rx cases may not be set in the configuration information for the number of guard symbols applied when operating in timing mode 7.

Additionally, although not separately shown, examples of the specification for 'Provided Guard Symbols MAC CE' described above can also be applied to 'Desired Guard Symbols MAC CE'. In this case, it can be interpreted to replace "Provided Guard Symbols MAC CE" with "Desired Guard Symbols MAC CE", and "Provided Guard Symbols MAC CE" as the node receiving from the parent node with "Desired Guard Symbols MAC CE" as the node sending to the parent node.

Hereinafter, embodiments of the present specification will be described again from the viewpoint of various subjects.

Hereinafter, for a better understanding of the examples of the present disclosure, the disclosure will be described with reference to drawings. The following drawings are intended to illustrate specific examples of the present disclosure. The names of specific devices or the names of specific signals/messages/fields shown in the drawings are for illustrative purposes only, and the technical features of the present disclosure are not limited to the specific names used in the drawings.

Figure 19:
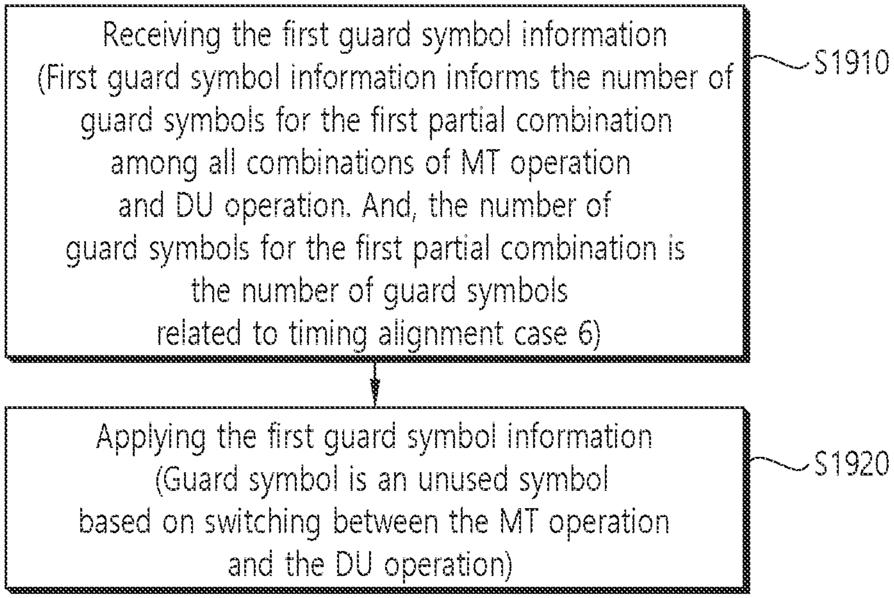
FIG. 19 is a flowchart of a method of receiving first guard symbol information, from a (child) node perspective, according to one embodiment of the present disclosure.

FIG. 19 is a flowchart of a method of receiving first guard symbol information from the perspective of a (child) node, according to an embodiment of the present specification.

The node can receive the first guard symbol information (S1910).

Additionally, the node may apply the first guard symbol information (S1920).

Here, the first guard symbol information may inform the number of guard symbols for the first partial combination among all combinations of mobile terminal (MT) operation and distributed unit (DU) operation.

Here, the number of guard symbols for the first partial combination may be the number of guard symbols related to timing alignment case 6.

Here, the guard symbol may be an unused symbol based on switching between the MT operation and the DU operation.

For example, the node may be an integrated access and backhaul (IAB) node.

For example, the MT operation may include at least one of MT transmission (TX) and MT reception (MT RX), and the DU operation may include at least one of DU TX and DU RX.

For example, the number of guard symbols for the first partial combination may include the number of guard symbols for the transition from MT TX for the timing alignment case 6 to DU TX for the timing alignment case 1, and the number of guard symbols for the transition from MT TX for the timing alignment case 6 to DU RX for the timing alignment case 1, the number of guard symbols for the transition from the DU TX for the timing alignment case 1 to the MT TX for the timing alignment case 6, and the number of guard symbols for the transition from the DU RX for the timing alignment case 1 to the MT TX for the timing alignment case 6.

For example, the first guard symbol information may indicate a number of guard symbols for a second partial combination of all combinations of the MT operation and the DU operation, and the number of guard symbols for the second partial combination of combinations may be a number of guard symbols related with timing alignment case 7.

For example, the node receives a second guard symbol information, the second guard symbol information indicating a number of guard symbols for the MT operation and the all combinations of operations, and the number of guard symbols for the all combinations may be a number of guard symbols related with timing alignment case 1.

For example, the node may support at least one of timing alignment case 1, the timing alignment case 6, and timing alignment case 7.

For example, in timing alignment case 1, the node can determine the time of MT TX (transmission) based on provided timing advance (TA) information.

For example, in timing alignment case 6, the node may determine the time of MT TX (transmission) based on the time of the DU TX for the node.

For example, in timing alignment case 7, the node may determine the time of MT TX (transmission) based on both provided timing advance (TA) information and additional TA information.

Since a more detailed description of the examples described above is the same as described above, repetition of overlapping content will be omitted.

Figure 20:
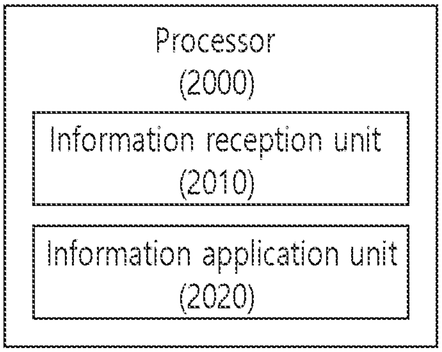
FIG. 20 is an example block diagram of a device for receiving first guard symbol information, from a (child) node perspective, according to one embodiment of the present disclosure.

FIG. 20 is an example of a block diagram of a device for receiving first guard symbol information from a (child) node perspective, according to an embodiment of the present specification.

According to FIG. 20, the processor 2000 may include an information reception unit 2010 and an information application unit 2020.

The information receiver 2010 may be configured to control the transceiver to receive first guard symbol information.

The information application unit 2020 may be configured to apply the first guard symbol information.

Here, the first guard symbol information may inform the number of guard symbols for the first partial combination among all combinations of mobile terminal (MT) operation and distributed unit (DU) operation.

Here, the number of guard symbols for the first partial combination may be the number of guard symbols related to timing alignment case 6.

Here, the guard symbol may be an unused symbol based on switching between the MT operation and the DU operation.

Since a more detailed description of the examples described above is the same as described above, repetition of overlapping content will be omitted.

Although not shown, a node may be provided. The node may include a transceiver, at least one memory, and at least one processor operatively coupled to the at least one memory and the transceiver. The at least one processor may be configured to control the transceiver to receive the first guard symbol information, and may be configured to apply the first guard symbol information. The first guard symbol information informs a number of guard symbols for a first partial combination of all combinations of a mobile terminal (MT) operation and a distributed unit (DU) operation, the number of guard symbols for the first partial combination is a number of guard symbols related with a timing alignment case 6, and the guard symbols are unused symbols based on switching between the MT operation and the DU operation.

Although not shown separately, an apparatus may be provided. The apparatus may include at least one memory and at least one processor operably coupled to the at least one memory. The at least one processor may be configured to control the transceiver to receive the first guard symbol information and to apply the first guard symbol information. The first guard symbol information informs a number of guard symbols for a first partial combination of all combinations of a mobile terminal (MT) operation and a distributed unit (DU) operation, the number of guard symbols for the first partial combination is a number of guard symbols related with a timing alignment case 6, and the guard symbols are unused symbols based on switching between the MT operation and the DU operation.

Although not shown, a recording medium may be provided. The recording medium may be at least one computer readable medium comprising instructions based on being executed by the at least one processor. The recording medium may be configured to control the transceiver to receive the first guard symbol information, and may be configured to apply the first guard symbol information. The first guard symbol information informs a number of guard symbols for a first partial combination of all combinations of a mobile terminal (MT) operation and a distributed unit (DU) operation, the number of guard symbols for the first partial combination is a number of guard symbols related with a timing alignment case 6, and the guard symbols are unused symbols based on switching between the MT operation and the DU operation.

Figure 21:
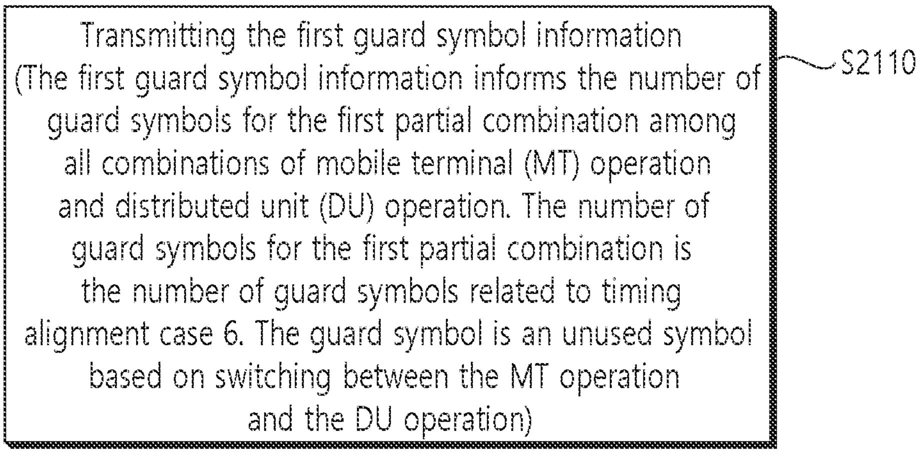
FIG. 21 is a flowchart of a method of transmitting first guard symbol information, from a (parent) node perspective, according to one embodiment of the present disclosure.

FIG. 21 is a flowchart of a method for transmitting first guard symbol information from the perspective of a (parent) node, according to an embodiment of the present specification.

According to FIG. 21, the node can transmit the first guard symbol information (S2110).

Here, the first guard symbol information may inform the number of guard symbols for the first partial combination among all combinations of mobile terminal (MT) operation and distributed unit (DU) operation.

Here, the number of guard symbols for the first partial combination may be the number of guard symbols related to timing alignment case 6.

Here, the guard symbol may be an unused symbol based on switching between the MT operation and the DU operation.

Figure 22:
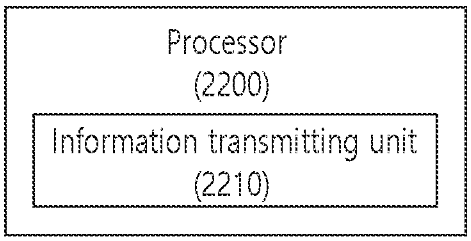
FIG. 22 is an example block diagram of a device transmitting first guard symbol information, from a (parent) node perspective, according to one embodiment of the present disclosure.

FIG. 22 is an example of a block diagram of a device transmitting first guard symbol information from the (parent) node perspective, according to an embodiment of the present specification.

According to FIG. 22, the processor 2200 may include an information transmission unit 2210.

The information transmission unit 2210 may be configured to control the transceiver to transmit first guard symbol information.

Here, the first guard symbol information may inform the number of guard symbols for the first partial combination among all combinations of mobile terminal (MT) operation and distributed unit (DU) operation.

Here, the number of guard symbols for the first partial combination may be the number of guard symbols related to timing alignment case 6.

Here, the guard symbol may be an unused symbol based on switching between the MT operation and the DU operation.

Although not separately shown, nodes may be provided. A node may include a transceiver, at least one memory, and at least one processor operably coupled with the at least one memory and the transceiver. The at least one processor may be configured to control the transceiver to transmit first guard symbol information. The first guard symbol information informs a number of guard symbols for a first partial combination of all combinations of a mobile terminal (MT) operation and a distributed unit (DU) operation, the number of guard symbols for the first partial combination is a number of guard symbols related with a timing alignment case 6, and the guard symbols are unused symbols based on switching between the MT operation and the DU operation.

Embodiments of the present disclosure have been described above. And, according to the present disclosure, the following effects may be provided.

Before explaining the effect, the previous problem is explained again as follows.

A guard symbol required during TDM operation between MT and DU may be introduced. There can be a total of 8 transition (or switching) cases for guard symbols. And the 8 cases can correspond to MT-Tx to DU-Tx, MT-Tx to DU-Rx, MT-Rx to DU-Tx, MT-Rx to DU-Rx, DU-Tx to MT-Tx, DU-Tx to MT-Rx, DU-Rx to MT-Tx, DU-Rx to MT-Rx. This can be configured to the IAB node from the parent node.

On the other hand, in future eIAB, new timing cases may be introduced for the IAB node. Depending on the timing case applied by the IAB node, the number of guard symbols required for TDM operation between MT and DU may be different than before.

However, currently, there is no consideration of the number of guard symbols required when switching between MT and DU depending on the timing case as above.

In this specification, a configuration for setting the number of guard symbols required when applying timing case 6 or timing case 7 is provided. According to this, the following effects can occur compared to the prior art.

Even in timing alignment case 6, if the number of guard symbols in timing alignment case 1 is used, resources may be wasted by using more guard symbols than necessary. In contrast, according to the present specification, use of guard symbols more than necessary is prevented, thereby preventing waste of resources.

Even in timing alignment case 6, if the number of guard symbols in timing alignment case 1 is used, a communication conflict may occur due to using fewer guard symbols than necessary. In contrast, according to the present specification, there is no possibility of collisions in communication (MT operation/DU operation), so stable wireless communication (MT operation/DU operation) can be supported.

Furthermore, since the guard symbol information may only indicate the number of guard symbols for some combination of MT/DU switching, the signaling may be compact, i.e., according to signaling according to the present disclosure (e.g., MAC CE), a small amount of signaling may be required to indicate the above number of guard symbols, thereby increasing the efficiency of the signaling.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

Figure 23:
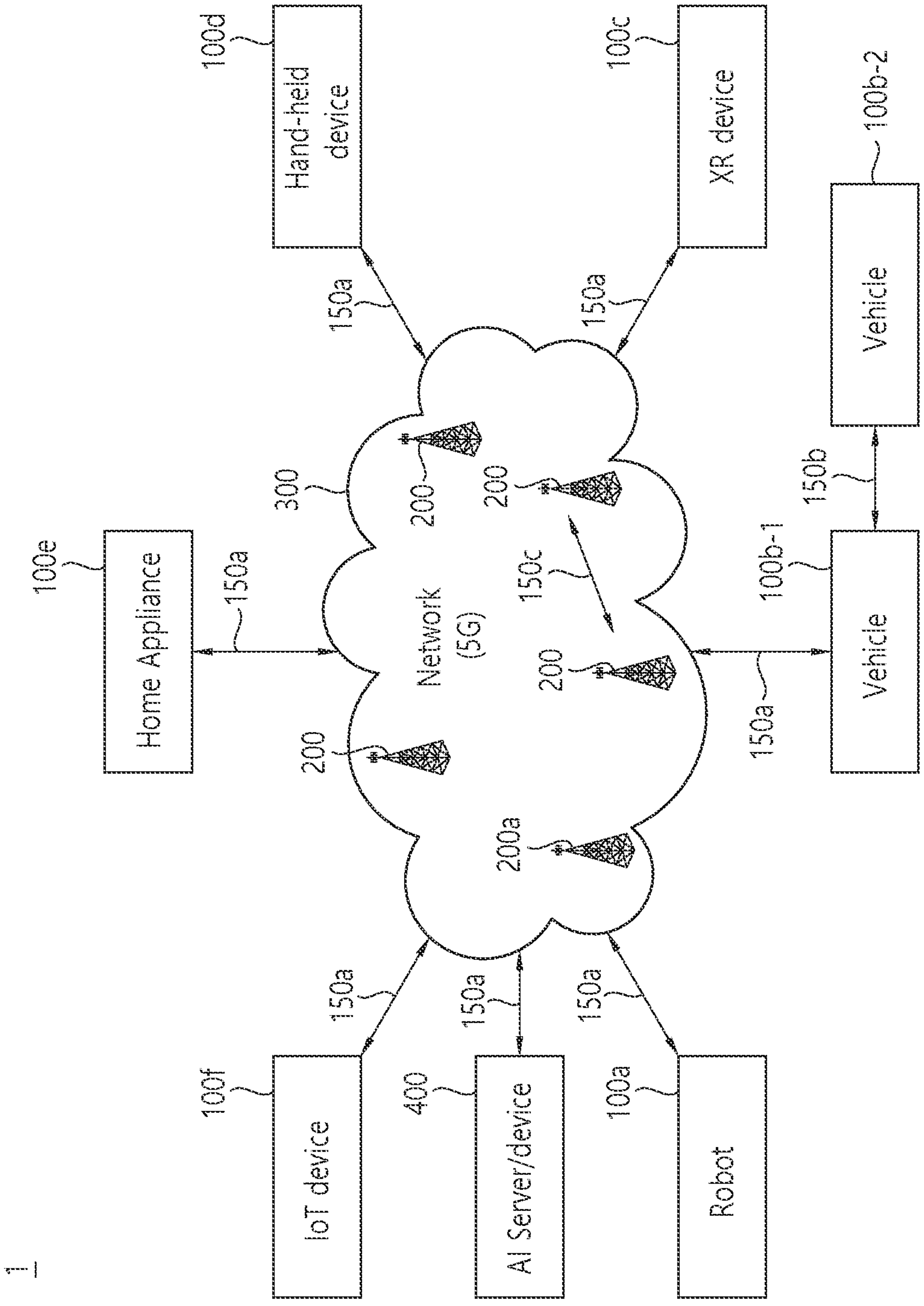
FIG. 23 shows an exemplary communication system (1), according to an embodiment of the present specification.

FIG. 23 shows an exemplary communication system (1), according to an embodiment of the present specification.

Referring to FIG. 23, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100*a*), vehicles (100*b*-1, 100*b*-2), an eXtended Reality (XR) device (100*c*), a hand-held device (100*d*), a home appliance (100*e*), an Internet of Things (IoT) device (100*f*), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200*a*) may operate as a BS/network node with respect to other wireless devices.

The wireless devices (100*a*~100*f*) may be connected to the network (300) via the BSs (200). An Artificial Intelligence (AI) technology may be applied to the wireless devices (100*a*~100*f*) and the wireless devices (100*a*~100*f*) may be connected to the AI server (400) via the network (300). The network (300) may be configured using a 3G network, a 4G (e.g., LTE) network, or a 5G (e.g., NR) network. Although the wireless devices (100*a*~100*f*) may communicate with each other through the BSs (200)/network (300), the wireless devices (100*a*~100*f*) may perform direct communication (e.g., sidelink communication) with each other without passing through the BSs/network. For example, the vehicles (100*b*-1, 100*b*-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100*a*~100*f*).

Wireless communication/connections (150*a*. 150*b*. 150*c*) may be established between the wireless devices (100*a*~100*f*)/BS (200), or BS (200)/BS (200). Herein, the wireless communication/connections may be established through various RATs (e.g., 5G NR) such as uplink/downlink communication (150*a*), sidelink communication (150*b*) (or D2D communication), or inter BS communication (150*c*) (e.g., relay. Integrated Access Backhaul (IAB)). The wireless devices and the BSs/the wireless devices may transmit/receive radio signals to/from each other through the wireless communication/connections (150*a*, 150*b*, 150*c*). For example, the wireless communication/connections (150*a*, 150*b*, 150*c*) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 KHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 9. Among the frequency ranges that are used in an NR system, FR1 may mean a "sub 6 GHz range", and FR2 may mean an "above 6 GHz range" and may also be referred to as a millimeter wave (mmW).

TABLE 9

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 10, FR1 may include a band within a range of 410 MHz to 7125 MHz. More specifically, FR1 may include a frequency band of 6 GHz (or 5850, 5900, 5925 MHZ, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 10

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, an example of wireless devices to which the present specification is applied will be described in detail.

Figure 24:
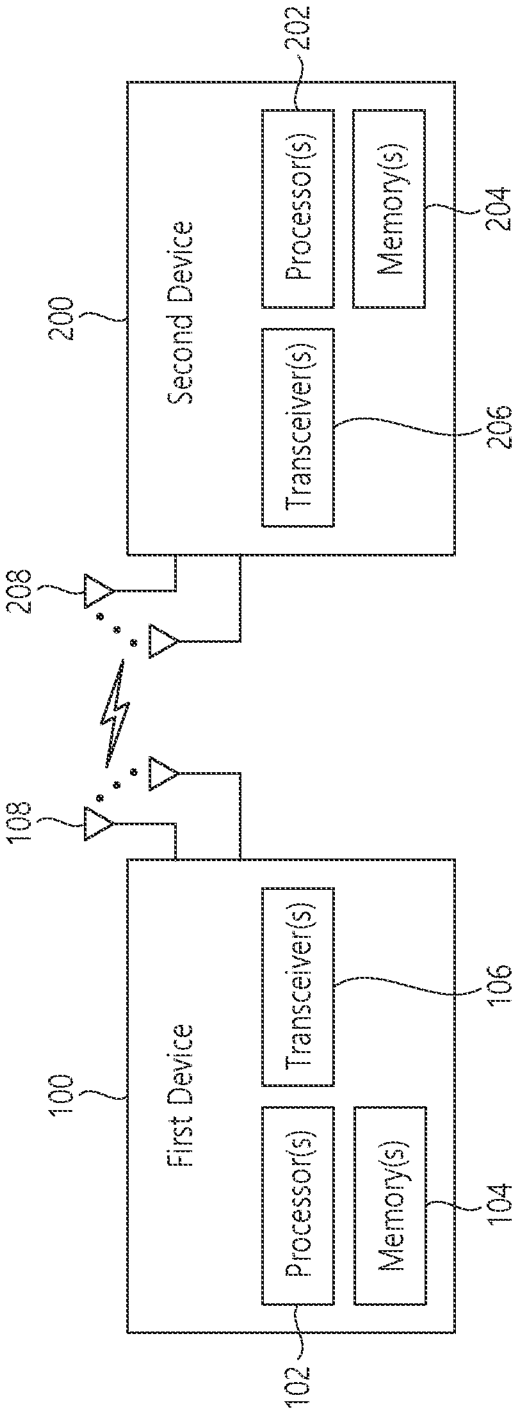
FIG. 24 shows an exemplary wireless device to which the present specification can be applied.

FIG. 24 shows an exemplary wireless device to which the present specification can be applied.

Referring to FIG. 24, a first wireless device (100) and a second wireless device (200) may transmit radio signals through a variety of RATs (e.g., LTE, NR). Herein, {the first wireless device (100) and the second wireless device (200)} may correspond to {the wireless device (100*x*) and the BS (200)} and/or {the wireless device (100*x*) and the wireless device (100*x*)} of FIG. 23.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/ signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs). Random Access Memories (RAMs). Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 25:
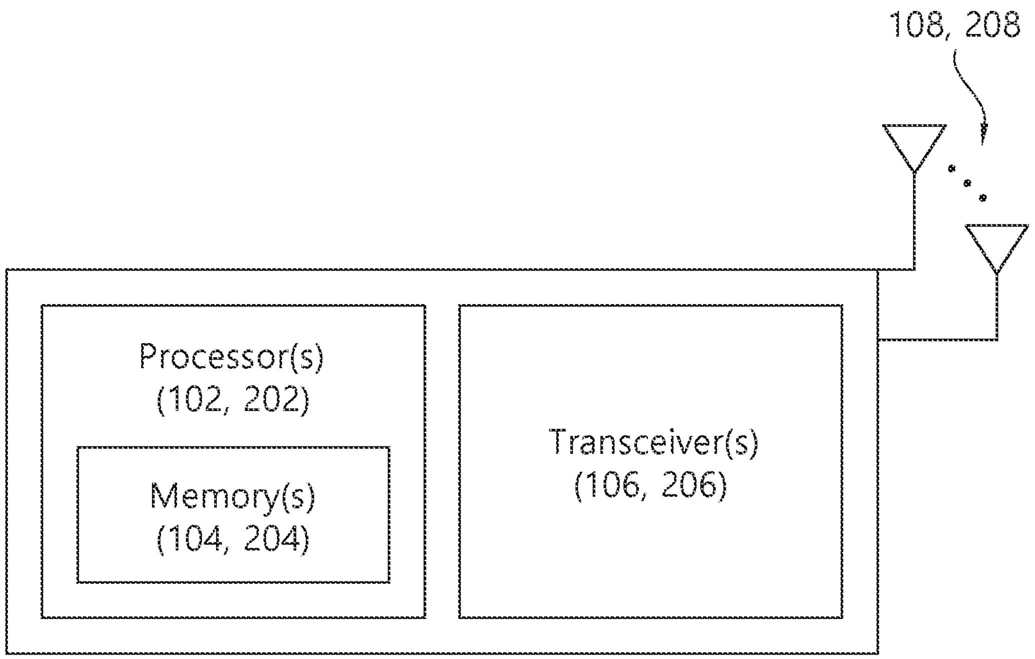
FIG. 25 shows another example of a wireless device applicable to the present specification.

FIG. 25 shows another example of a wireless device applicable to the present specification.

According to FIG. 25, the wireless device may include at least one processor (102, 202), at least one memory (104, 204), at least one transceiver (106, 206), and/or one or more antennas (108, 208).

As a difference between the example of the wireless device described above in FIG. 24 and the example of the wireless device in FIG. 25, in FIG. 24, the processors 102 and 202 and the memories 104 and 204 are separated, but in the example of FIG. 25, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method, comprising:

receiving, by an integrated access and backhaul (IAB) node comprising an IAB-mobile terminal (IAB-MT) and an IAB-distributed unit (IAB-DU), guard symbol information; and switching, by the IAB node, between an IAB-MT operation and an IAB-DU operation, wherein the guard symbol information comprises a field informing the number of guard symbols for the switching, wherein a guard symbol informed by the guard symbol information is an unused symbol related to the switching, and wherein based on the IAB node being set to a case-6 timing mode, the IAB node sets a transmission time of the IAB-MT to a transmission time of the IAB-DU.

2. The method of claim 1, wherein the IAB-MT operation comprises IAB-MT transmission (Tx) and IAB-MT reception (Rx), and wherein the IAB-DU operation comprises IAB-DU Tx and IAB-DU Rx.

3. The method of claim 1, wherein a value for the number of guard symbols is specified for each of switching scenarios in the guard symbol information, and wherein, for the case-6 timing mode, the switching scenarios include four switching scenarios: 1) IAB-MT Tx for the case-6 timing mode to IAB-DU Tx for a case-1 timing mode; 2) IAB-MT Tx for the case-6 timing mode to IAB-DU Rx for the case-1 timing mode; 3) IAB-DU Tx for the case-1 timing mode to IAB-MT Tx for the case-6 timing mode; and 4) IAB-DU Rx for the case-1 timing mode to IAB-MT Tx for the case-6 timing mode.

4. The method of claim 1, wherein the IAB node supports a case-1 timing mode, the case-6 timing mode, and a case-7 timing mode.

5. The method of claim 4, wherein in the case-1 timing mode, the IAB node determines a transmission time of the IAB-MT based on provided timing advance, TA, information.

6. The method of claim 4, wherein in the case-7 timing mode, the IAB node determines a transmission time of the IAB-MT based on both provided timing advance, TA, information and additional TA information.

7. An integrated access and backhaul (IAB) node including an IAB-mobile terminal (IAB-MT) and an IAB-distributed unit (IAB-DU), the IAB node comprising:

at least one transceiver;

at least one memory; and at least one processor operatively coupled with the at least one memory and the at least one transceiver, wherein the at least one memory stores instructions that, based on being executed by the at least one processor, cause the at least one processor to perform operations comprising:

receiving guard symbol information; and switching between an IAB-MT operation and an IAB-DU operation, wherein the guard symbol information comprises a field informing the number of guard symbols for the switching, wherein a guard symbol informed by the guard symbol information is an unused symbol related to the switching, and wherein based on the IAB node being set to a case-6 timing mode, the IAB node sets a transmission time of the IAB-MT to a transmission time of the IAB-DU.

* * * * *